US011565660B2

(12) United States Patent
Pina-Cabello et al.

(10) Patent No.: US 11,565,660 B2
(45) Date of Patent: Jan. 31, 2023

(54) MULTIPLE WIPER BLADE ADAPTER FOR WIPER BLADE ASSEMBLY

(71) Applicant: Trico Products Corporation, Rochester Hills, MI (US)

(72) Inventors: Ricardo Pina-Cabello, Oakland Township, MI (US); Alexander Kowal, Clarkston, MI (US); Kole Brunsman, Fraser, MI (US); Nicholas Nemeth, Rochester Hills, MI (US); Mitica Polocoser, Plymouth Township, MI (US); Nicholas Finateri, Flint, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 158 days.

(21) Appl. No.: 16/946,596

(22) Filed: Jun. 29, 2020

(65) Prior Publication Data
US 2021/0009084 A1   Jan. 14, 2021

Related U.S. Application Data

(60) Provisional application No. 62/868,221, filed on Jun. 28, 2019.

(51) Int. Cl.
*B60S 1/40* (2006.01)
*B60S 1/34* (2006.01)

(52) U.S. Cl.
CPC .......... *B60S 1/3456* (2013.01); *B60S 1/3431* (2013.01); *B60S 1/4077* (2013.01); *B60S 2001/409* (2013.01)

(58) Field of Classification Search
CPC .......... B60S 1/4087; B60S 1/387; B60S 1/40
See application file for complete search history.

(56) References Cited

U.S. PATENT DOCUMENTS

| | | | |
|---|---|---|---|
| 7,055,207 B2 * | 6/2006 | Coughlin | B60S 1/4006 15/250.32 |
| 10,077,027 B2 * | 9/2018 | Zeiser | B60S 1/381 |
| 2015/0096142 A1 * | 4/2015 | Zeiser | B60S 1/3863 15/250.201 |
| 2021/0094514 A1 * | 4/2021 | Kowal | B60S 1/3418 |

* cited by examiner

*Primary Examiner* — Michael D Jennings
(74) *Attorney, Agent, or Firm* — Bryan Cave Leighton Paisner LLP

(57) ABSTRACT

A wiper system and, more specifically, wiper adapters are provided for wiper assemblies. The adapter engages retention features formed on the front end of the wiper arm, and the blade assembly is equipped with an adapter that mates with the arm geometry to secure itself together. The adapters mount to a common arm geometry and allow for ready, direct connection of the wiper arm to the adapter, which in turn connects to a wiper assembly.

20 Claims, 28 Drawing Sheets

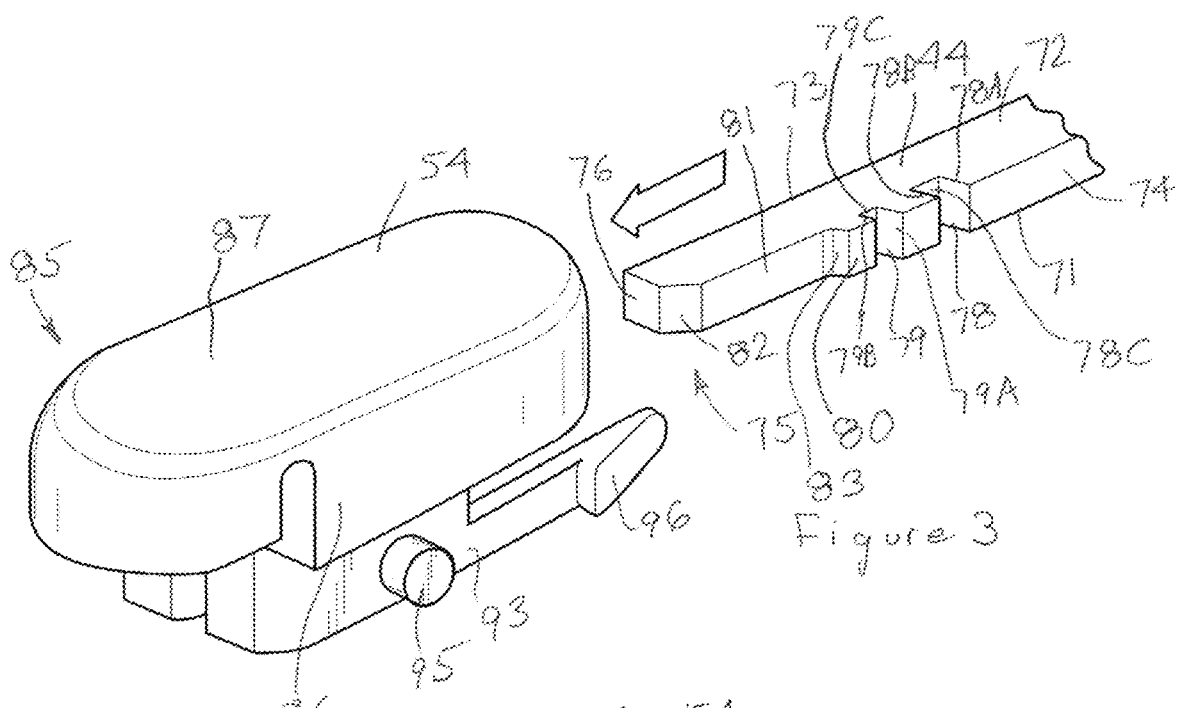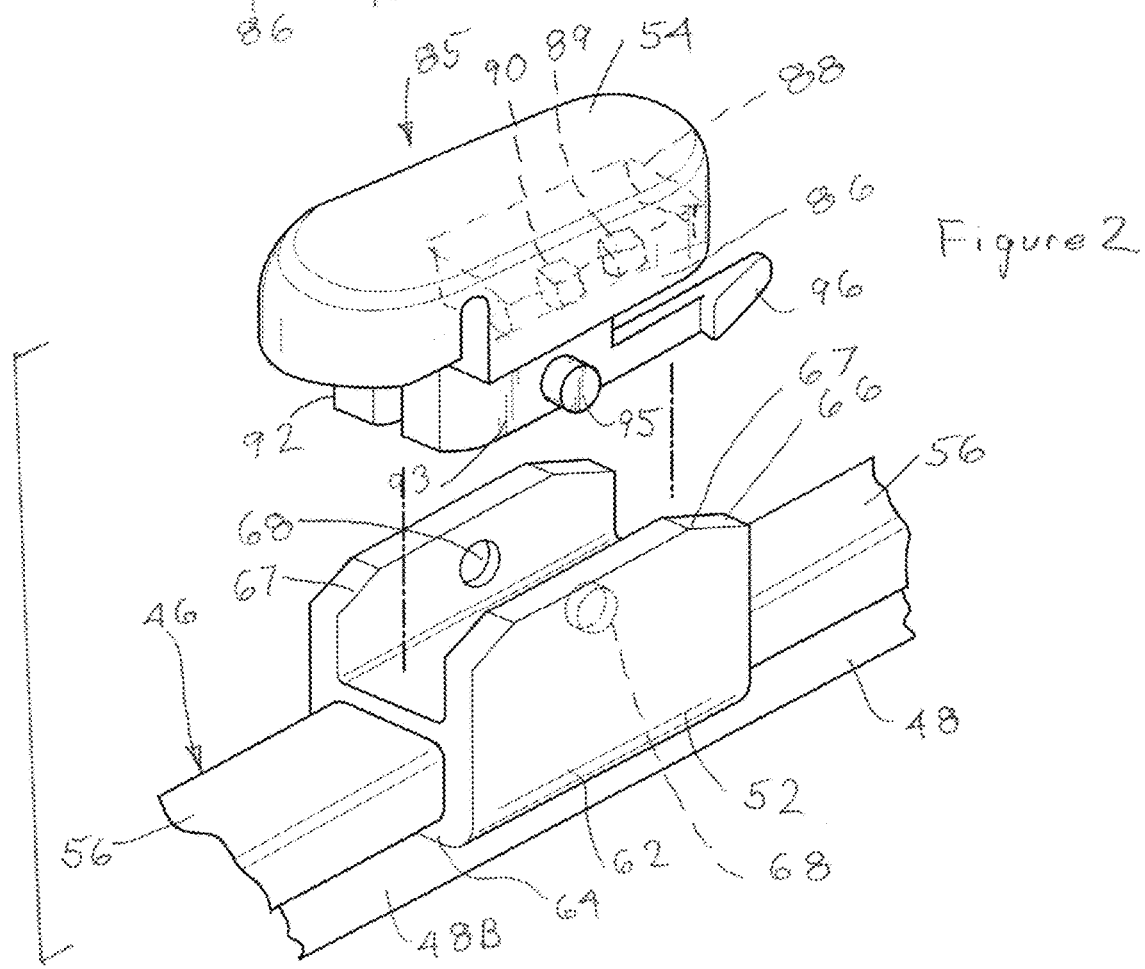

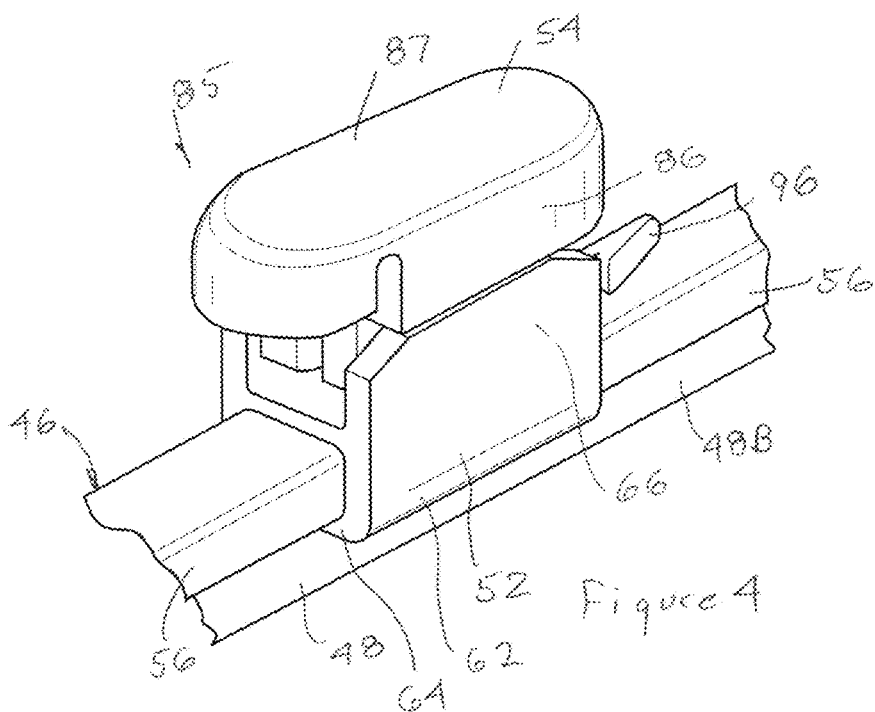
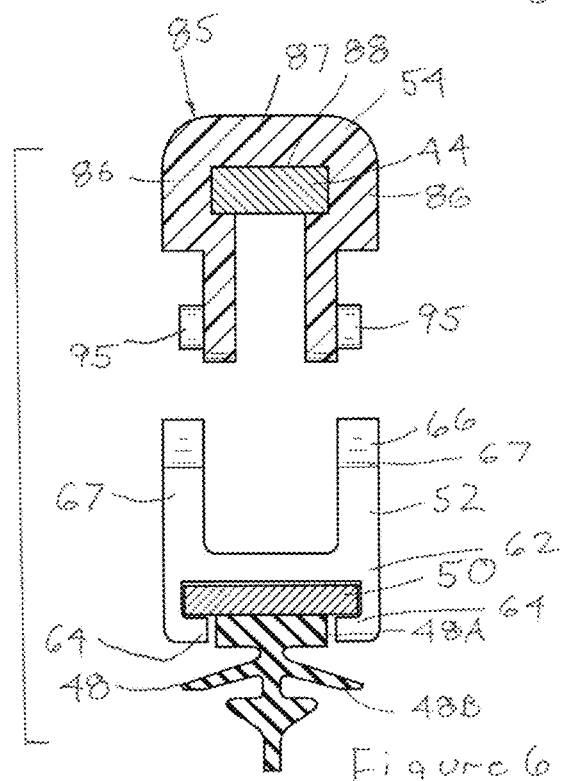
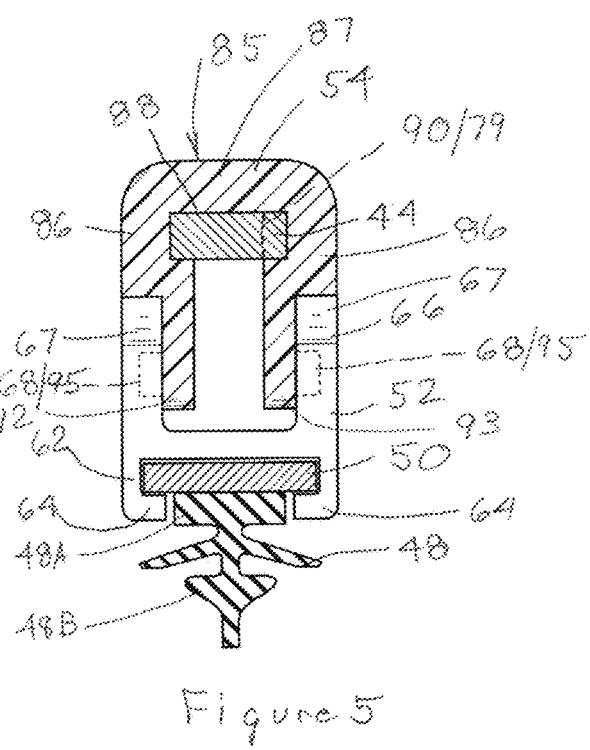

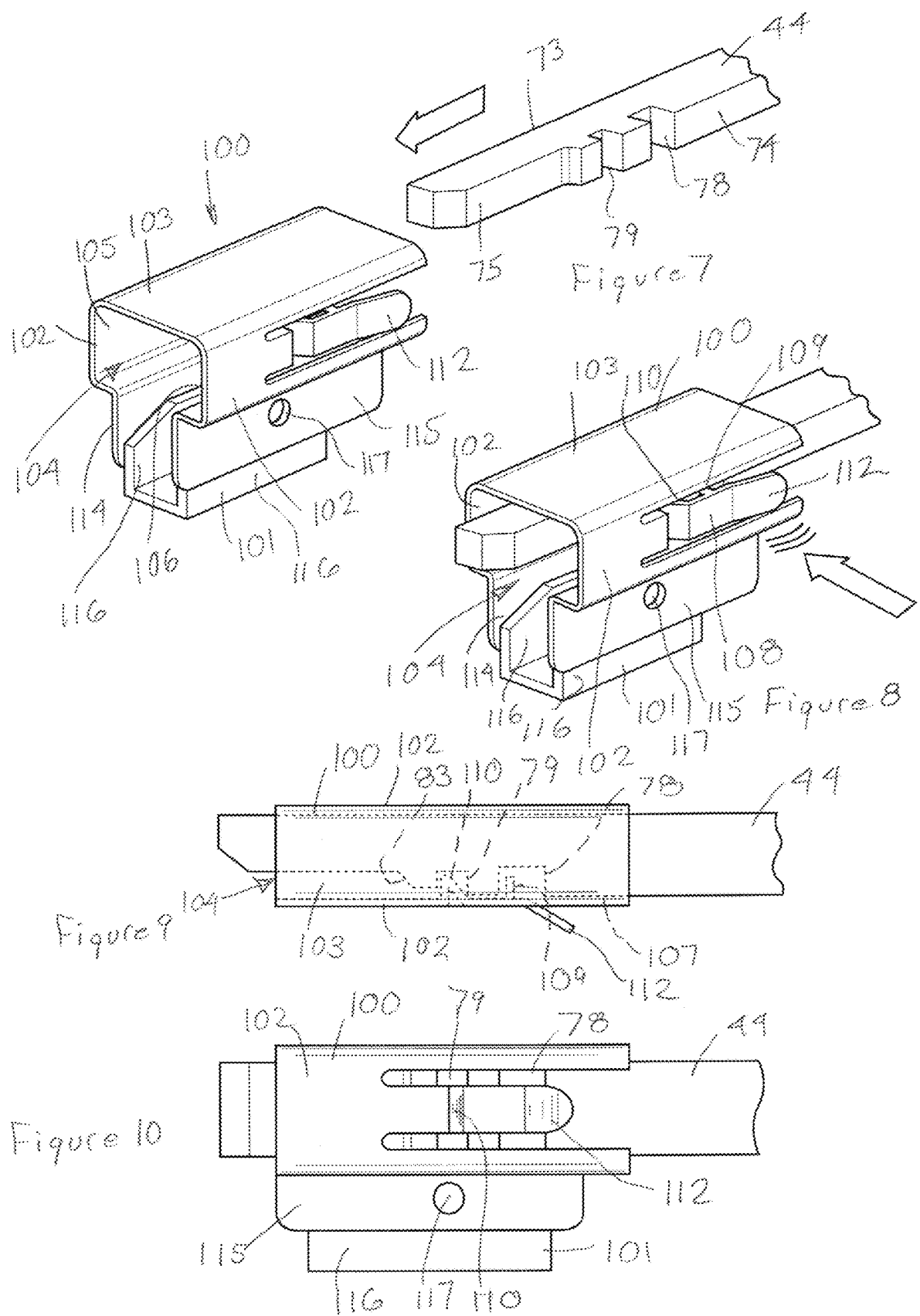

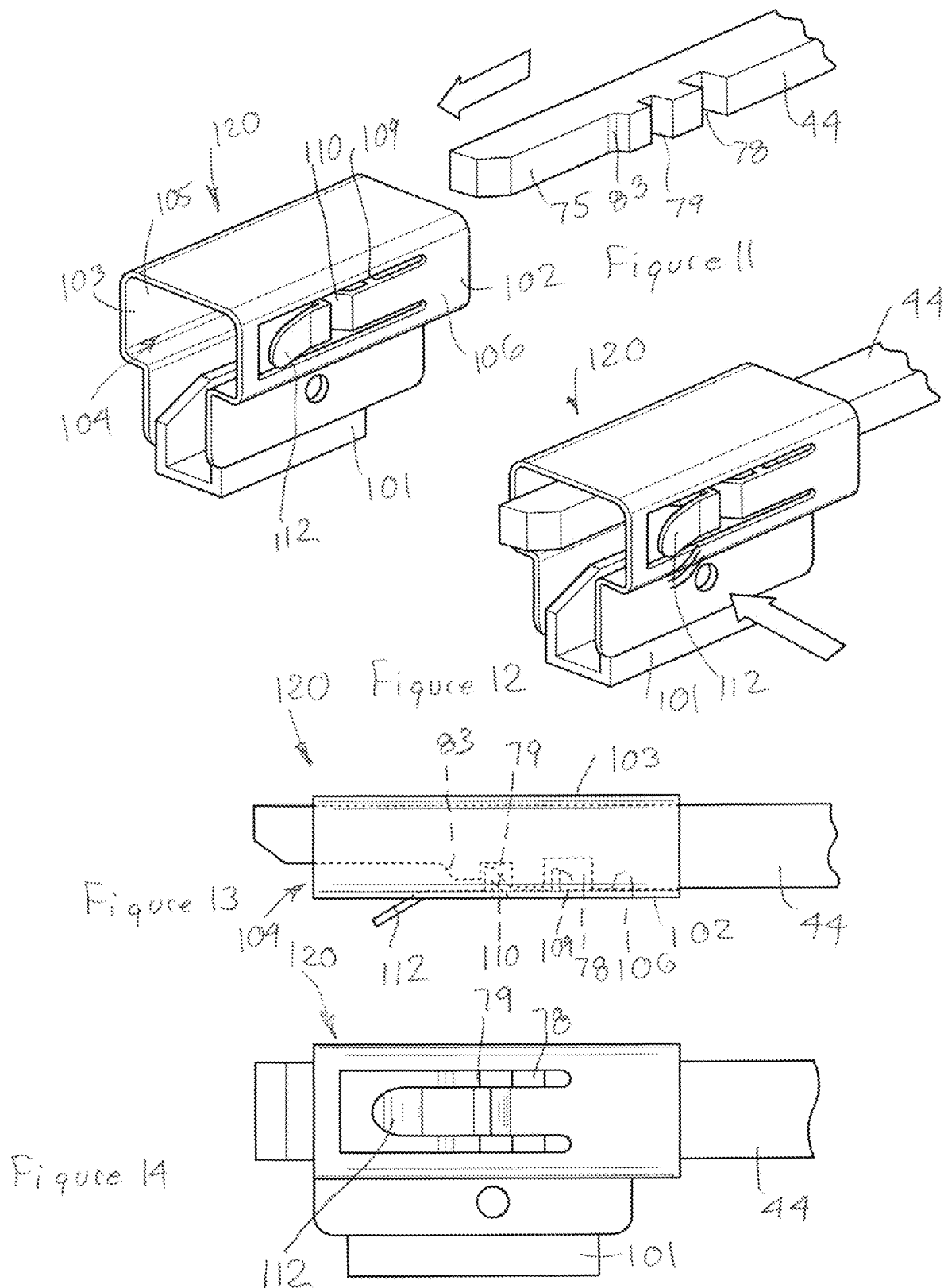

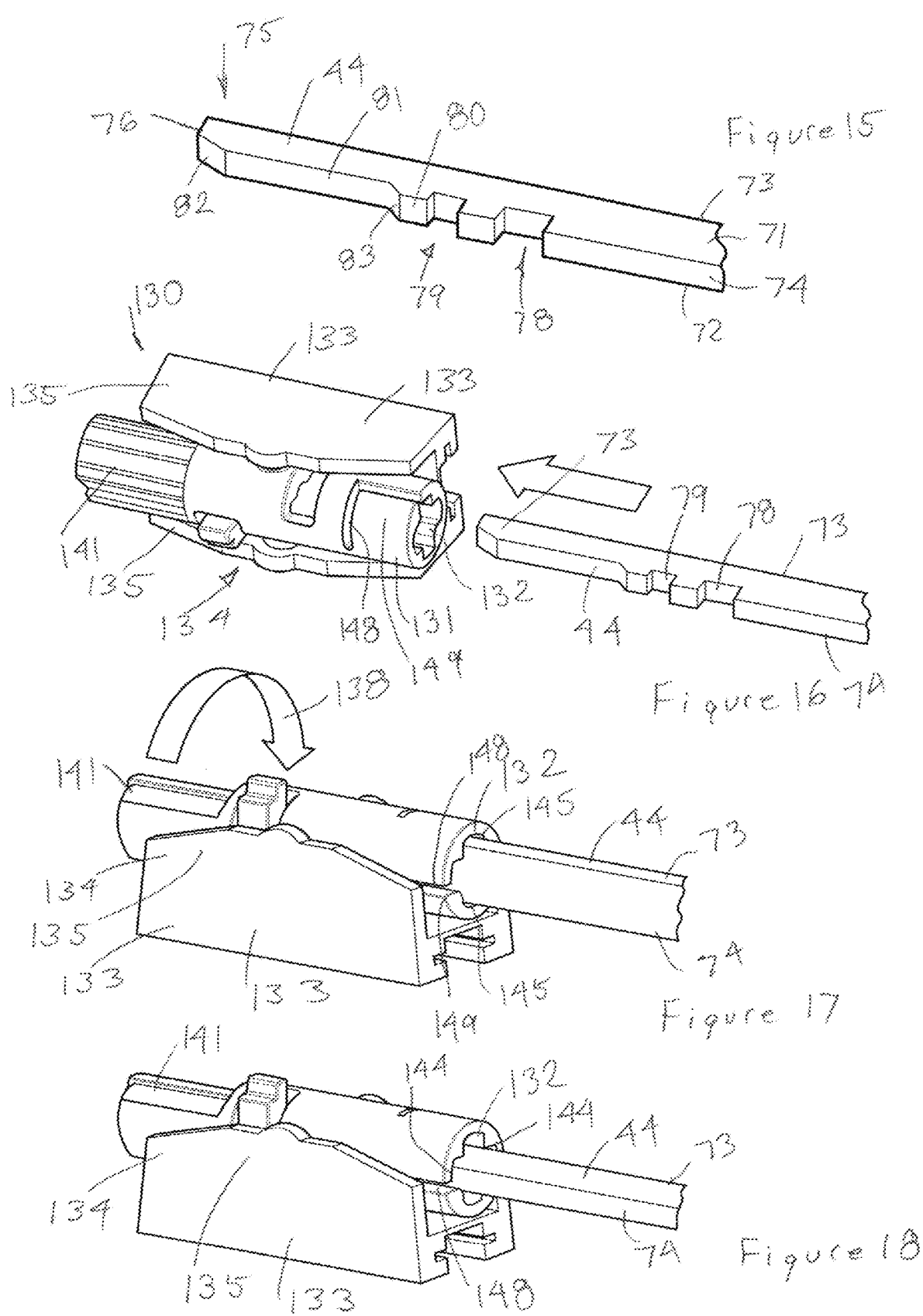

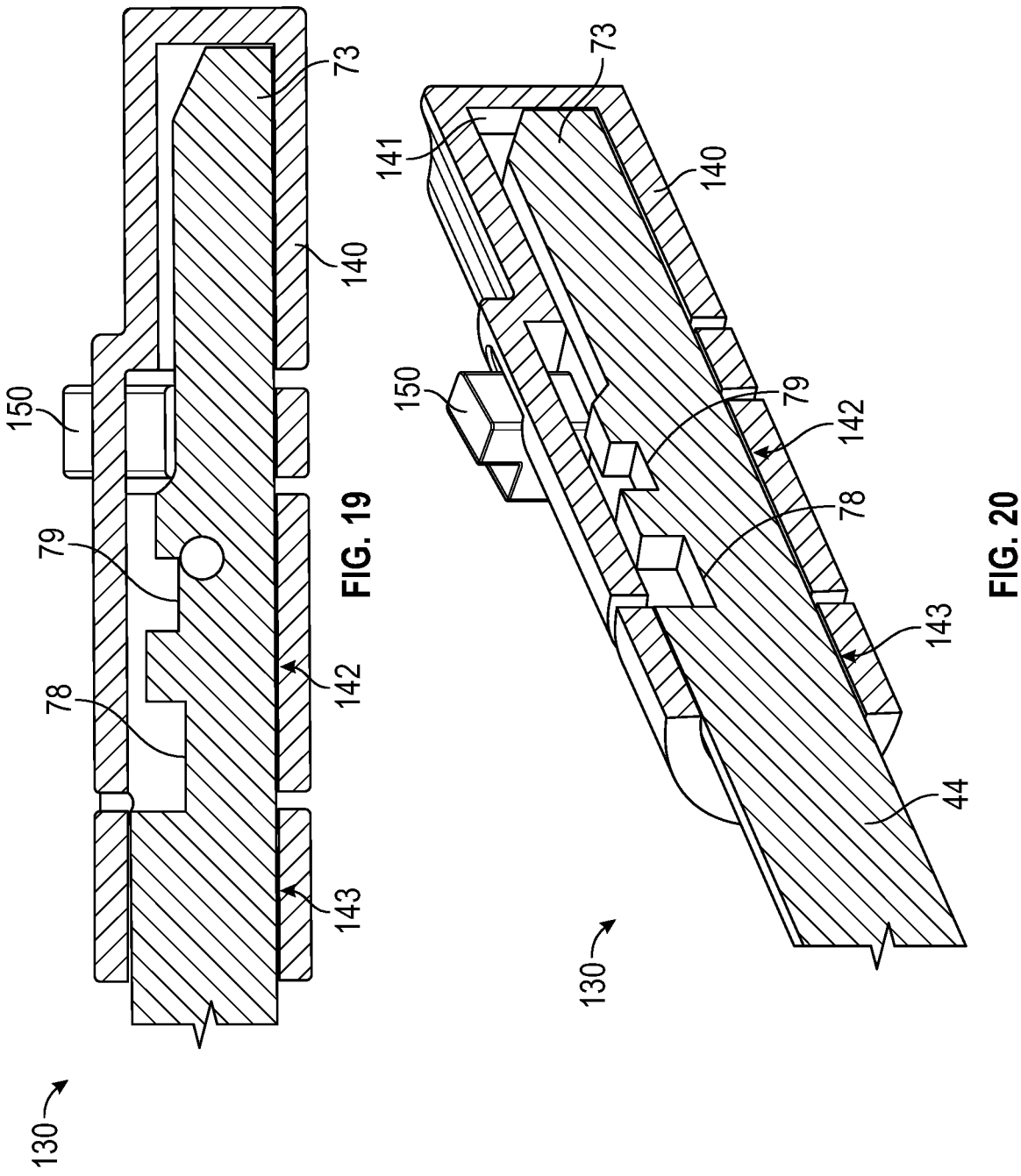

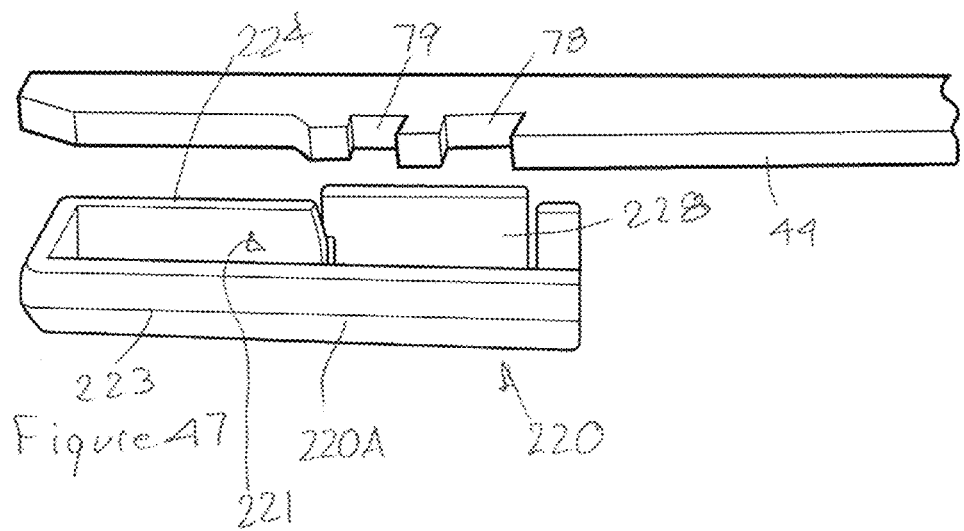
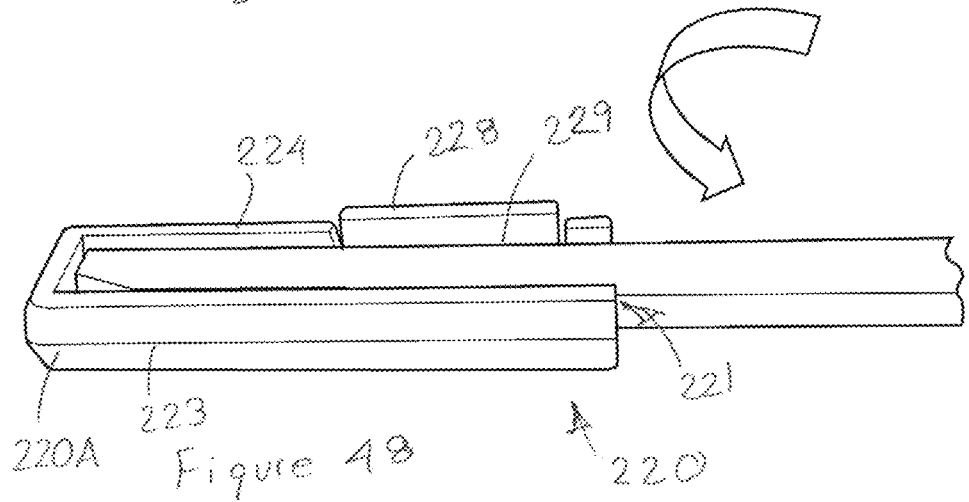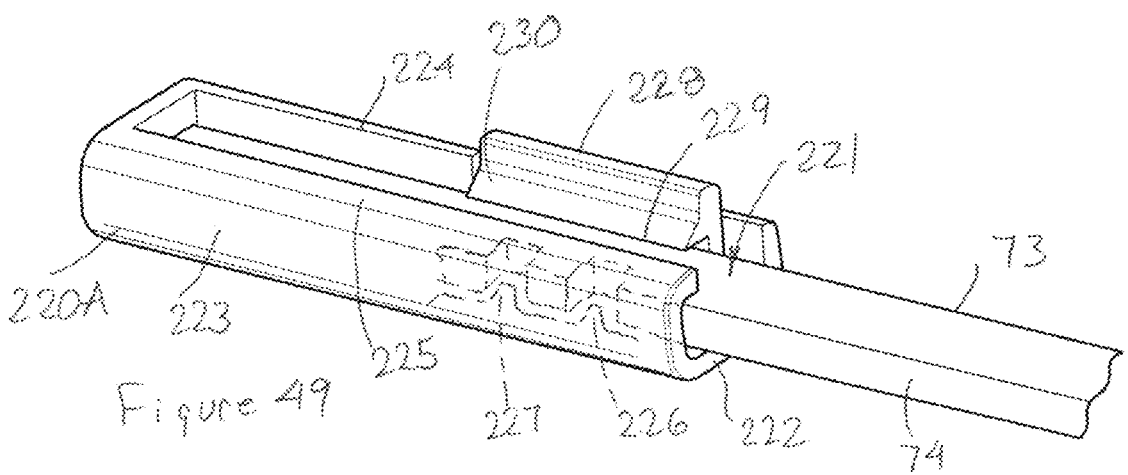

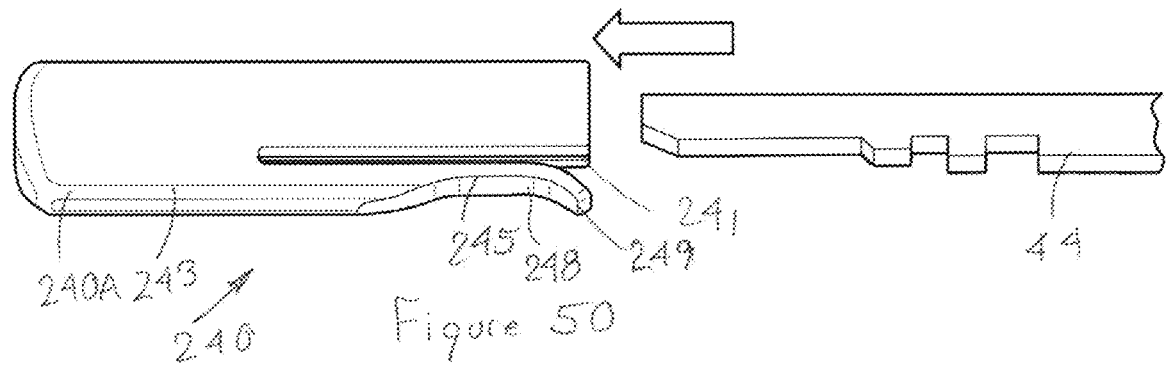
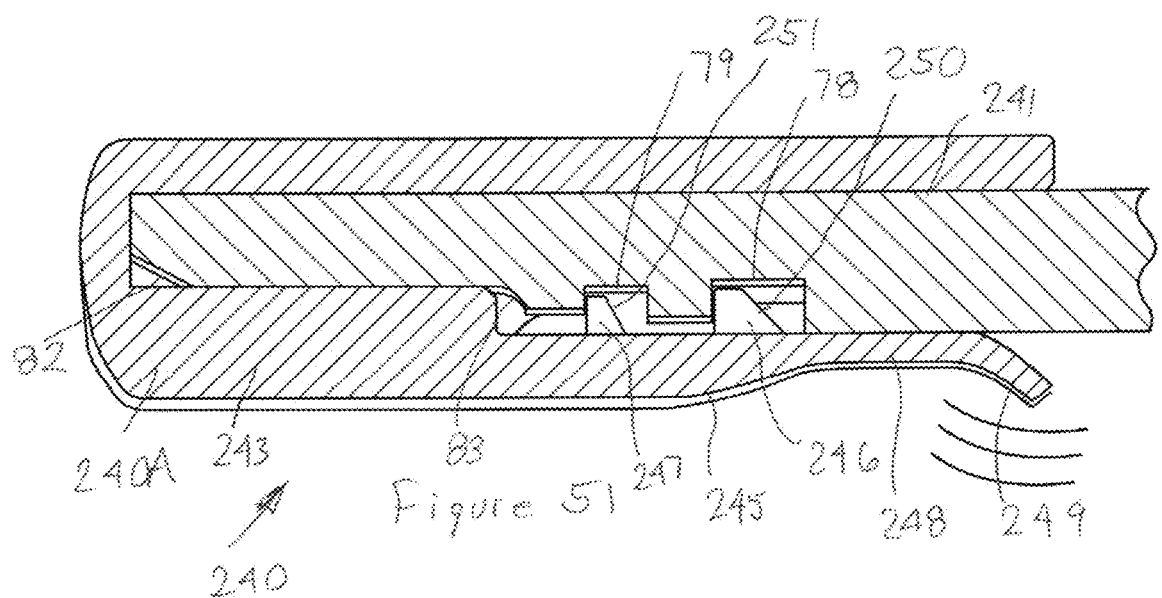
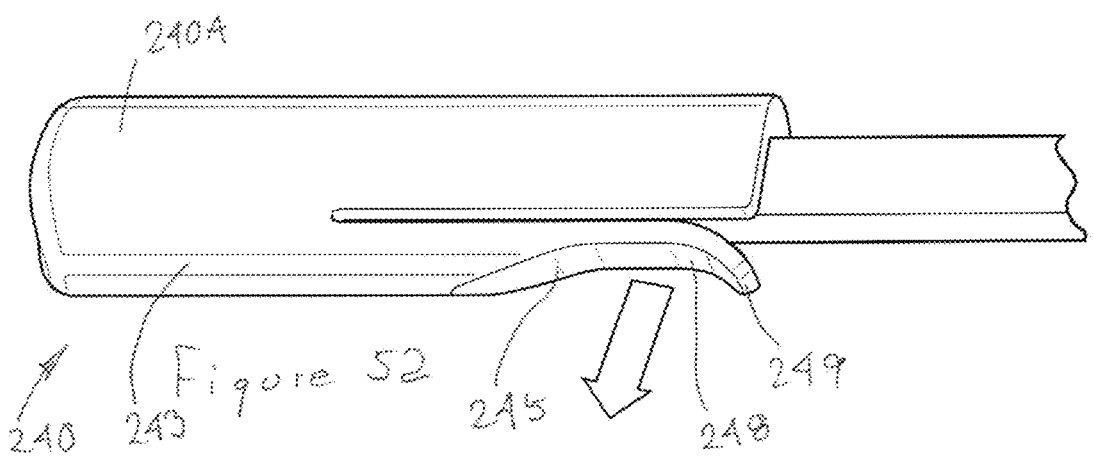

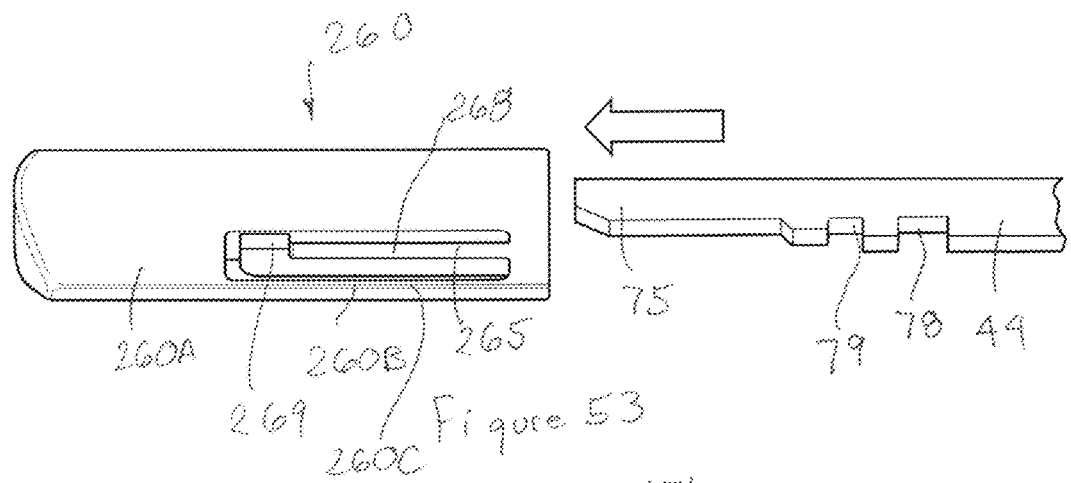
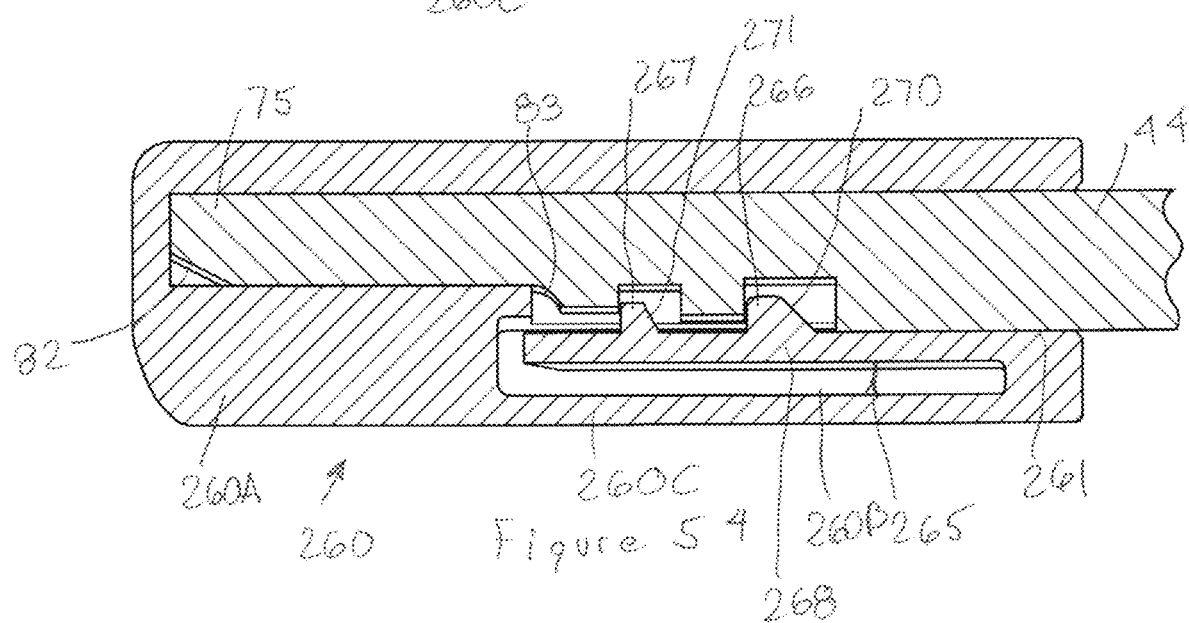
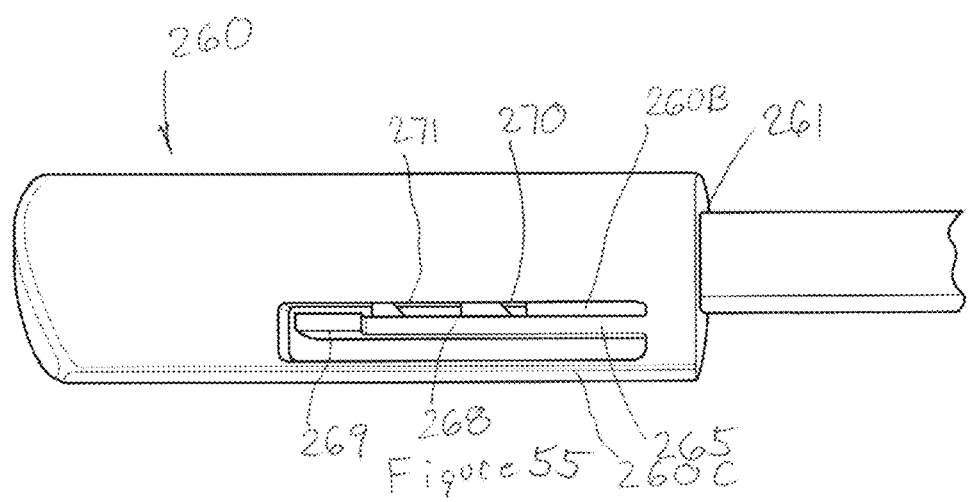

MULTIPLE WIPER BLADE ADAPTER FOR WIPER BLADE ASSEMBLY

CROSS-REFERENCE TO RELATED APPLICATION

This application claims priority to and all the benefits of U.S. Provisional Application No. 62/868,221, filed Jun. 28, 2019, the disclosure of which is incorporated herein by reference in its entirety.

BACKGROUND OF THE INVENTION

1. Field of the Invention

The invention relates to wiper adapters for wiper blade assemblies and more particularly to a wiper blade adapter for connecting a wiper arm to a wiper blade.

2. Description of the Related Art

Conventional automotive wiper systems known in the art typically include some type of wiper assembly (sometimes referred to as a wiper blade) mounted to a wiper arm which, in turn, is mounted adjacent to a surface to be wiped, such as a windshield of a vehicle, and is pivotally driven to impart reciprocal motion to the wiper assembly across the windshield. The wiper assembly typically includes a rubber wiping element that contacts the windshield across the surface to be wiped. Modern wiper assemblies often employ one or more metal strips that act to reinforce the wiping element and facilitate wiping of the wiping element across what is typically a curved glass surface. The wiper assembly also typically includes a coupler that attaches to and supports the one or more metal strips, and an adapter pivotally attached to the coupler. The adapter allows the wiper assembly to be releasably attached to the wiper arm. In this context, the wiper arm delivers a downward force to the wiper assembly in use. The force is distributed across the wiper assembly so as to press the wiper assembly into contact with the windshield. The wiper assembly also typically includes an airfoil that attaches to the metal strips, and may also include end caps located at respective longitudinal ends of the wiper assembly.

Each of the components of a wiper assembly of the type described above must cooperate to effectively clean a surface to be wiped. In addition, each of the components must be designed not only to facilitate an improved wipe quality, but also so as to reduce the cost and complexity of assembling the wiper assembly.

While wiper assemblies known in the related art have generally performed well for their intended purpose, there remains a need in the art for a wiper assembly that has superior operational characteristics, reduces the cost of manufacturing the assembly, and provides simple releasable attachment to wiper arms.

SUMMARY OF THE INVENTION

The present invention overcomes disadvantages in the related art by providing an adapter for use in releasably attaching a wiper assembly to a wiper arm having an attachment member. The adapter constructions of the present invention are used to affix wiper blade assemblies to wiper arms assemblies without the need of a connector part on the wiper arm to attach the blade. The inventive adapters further have the potential of providing better aerodynamic performance.

In more detail, the present invention relates, generally, to wiper systems and, more specifically, to wiper adapters for wiper assemblies. The existing technology in known wiper blade assemblies uses one additional component know as a connector part of the wiper arm assembly that is used to retain the wiper blade. This invention allows removal of the connector component from the wiper arm and instead replaces it with retention features formed on the front end of the wiper arm also known as the wiper arm rod. The blade assembly is equipped with an adapter that mates with the arm rod geometry to secure itself together. The various embodiments of the inventive adapters as disclosed herein all mount to a common arm geometry and allow for ready, direct connection of the wiper arm to the adapter, which in turn connects to a wiper assembly.

In this way, the adapter and wiper assembly of the present invention cooperate to effectively clean a surface to be wiped and, at the same time, provide simple releasable attachment to the wiper arm attachment member. Further, the adapter and wiper assembly of the present invention provide advantages related to usability, manufacturing, component assembly, and performance in use.

BRIEF DESCRIPTION OF THE DRAWINGS

Other objects, features, and advantages of the present invention will be readily appreciated as the same becomes better understood after reading the subsequent description taken in connection with the accompanying drawings wherein:

FIG. 2 is an exploded perspective view of a wiper assembly provided with an inventive adapter according to a first embodiment of the invention.

FIG. 3 is an exploded perspective view showing the adapter being engaged with a wiper arm.

FIG. 4 is a perspective view of the adapter assembled to the wiper assembly.

FIG. 5 is a cross-sectional end view of the adapter and wiper assembly.

FIG. 6 is an exploded cross-sectional view of the wiper assembly with the adapter disengaged.

FIG. 7 is an exploded perspective view of a second embodiment of an adapter usable with the wiper arm.

FIG. 8 is a perspective view thereof after assembly of the wiper arm to the adapter of FIG. 7.

FIG. 9 is a top view thereof.

FIG. 10 is a side view thereof.

FIG. 11 is an exploded perspective view of a third embodiment of an adapter usable with the wiper arm.

FIG. 12 is a perspective view thereof after assembly of the wiper arm to the adapter of FIG. 11.

FIG. 13 is a top view thereof.

FIG. 14 is a side view thereof.

FIG. 15 is a further perspective view of the wiper arm.

FIG. 16 is a perspective view of a fourth embodiment of an adapter with the components in a first orientation.

FIG. 17 is a perspective view of the fourth embodiment of an adapter with the components in a second orientation and the wiper arm in an unlocked orientation for insertion.

FIG. 18 is a perspective view of the adapter with the wiper arm rotated to a locked orientation.

FIG. 19 is a cross sectional side view of the adapter of FIG. 17.

FIG. 20 is a cross sectional perspective view thereof.

FIG. 47 is perspective view of an eighth embodiment of an adapter in combination with a wiper arm.

FIG. 48 is a perspective view as the wiper arm is inserted into the adapter slot.

FIG. 49 is a perspective view of the wiper arm rotated to an installed position.

FIG. 50 is perspective view of a ninth embodiment of an adapter in combination with a wiper arm.

FIG. 51 is a cross sectional view thereof.

FIG. 52 is a perspective view showing the wiper arm assembled to the adapter.

FIG. 53 is perspective view of a tenth embodiment of an adapter in combination with a wiper arm.

FIG. 54 is a cross sectional side view thereof.

FIG. 55 is a perspective view showing the wiper arm assembled to the adapter.

Figure 1:
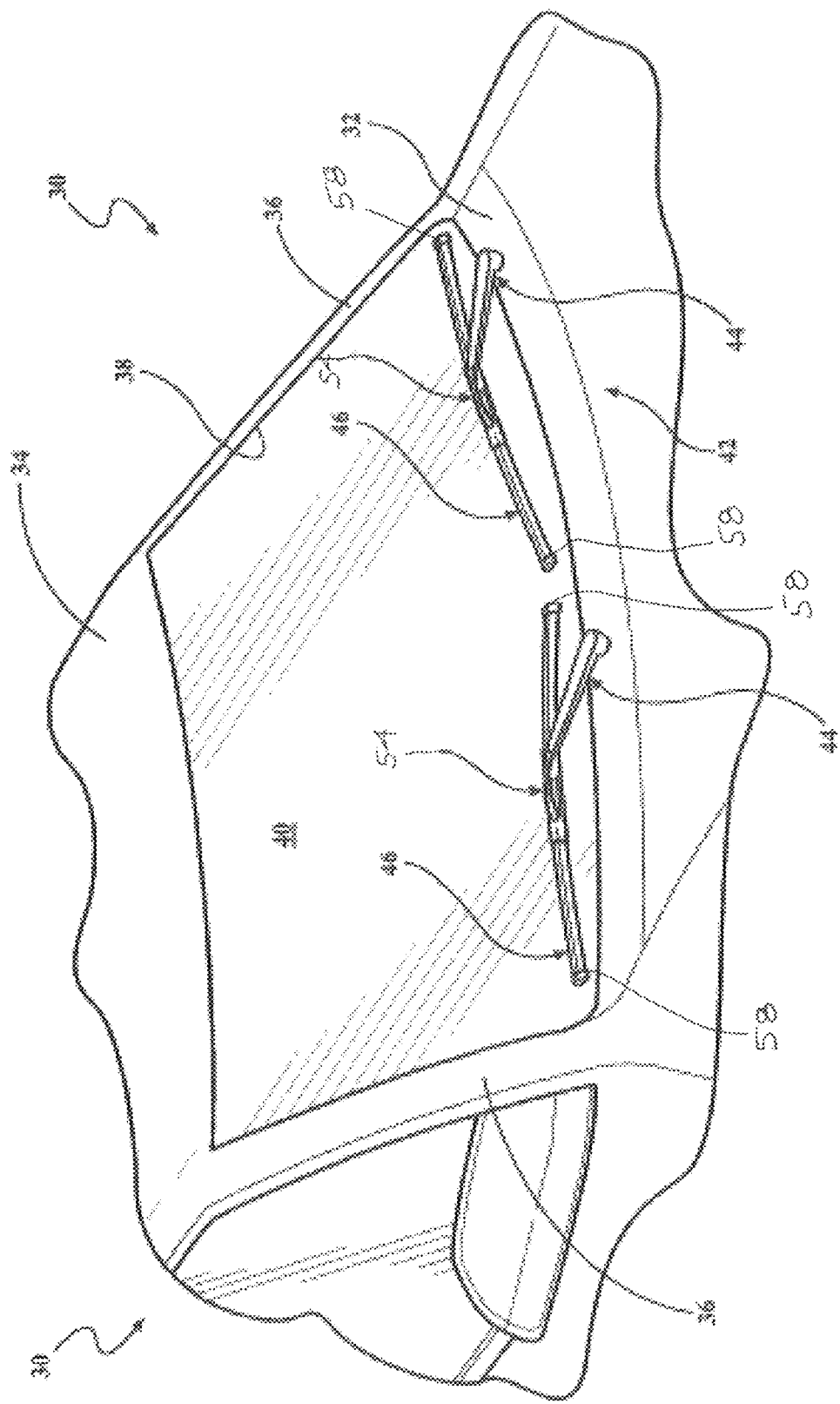
FIG. 1 is a partial perspective view of a front of a vehicle having a pair of wiper assemblies pivotally mounted to respective wiper arms for reciprocal movement across a windshield of the vehicle.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

With reference to the Figures, where like numerals are used to designate like structure throughout the several views, a portion of a vehicle is schematically illustrated at 30 in FIG. 1. The vehicle 30 includes a cowl 32, a roof 34, and a pair of laterally spaced front A-pillars 36 extending between the roof 34 and the cowl 32. The A-pillars 36, roof 34, and cowl 32 cooperate to define a generally rectangular opening 38 in which a curved or "swept back" glass windshield 40 is supported. As illustrated, the vehicle 30 is an automobile, but could be any type of vehicle, such as a heavy-duty truck, train, airplane, ship, construction vehicle or equipment, military vehicle, or any other type of vehicle that contains surface wiper systems.

A wiper system is generally indicated at 42 in FIG. 1 and is employed to clean the windshield 40. The wiper system 42 includes a pair of wiper arms, generally indicated at 44, and a pair of wiper assemblies, generally indicated at 46, which correspond to the driver and passenger sides of the vehicle 30. However, those having ordinary skill in the art will appreciate that the wiper system 42 could employ a single wiper arm 44 and a single wiper assembly 46, or more than two wiper arms 44 and more than two wiper assemblies 46, without departing from the scope of the present invention. In the representative example illustrated herein, each wiper assembly 46 is carried by a corresponding wiper arm 44. The wiper system 42 also typically includes at least one electric motor and a linkage (not shown, but generally known in the art) to move the wiper assemblies 46 in an oscillating manner across the surface of the windshield 40.

While the wiper assembly 46 illustrated in FIG. 1 is shown in connection with the front windshield 40 of the vehicle 30, those having ordinary skill in the art will appreciate that wiper assemblies 46 could be used in other areas of the vehicle 30 that employ a wiper system 42, such as a rear window (not shown) or a head lamp (not shown). Thus, it will be understood that the present invention as disclosed in the Figures of this application is not limited for use solely in connection with wiper arms 44 adapted for use on a vehicle's windshield 40, but are adapted for use in all applications where wiper systems 32 are employed.

Referring now to FIGS. 2-6, the wiper assembly 46 includes a wiping element 48 that is adapted to contact a surface of the vehicle 30 to be wiped, in this representative example, the windshield 40. The wiper assembly 46 also includes at least one support member 50 (FIGS. 5 and 6) that defines a longitudinal axis and that acts to reinforce or support the wiping element 48. In the representative embodiment illustrated herein, the support member 50 is a monolithic beam mounted directly to the wiping element 48. However, those having ordinary skill in the art will appreciate from the description that follows that the support member 50 could be either monolithic or defined by a pair of splines (not shown, but generally known in the art) without departing from the scope of the present invention. The wiper assembly 46 also includes a coupler 52 operatively attached to the support member 50. As is described in detail below, the coupler 52 is configured to attach to an inventive adapter 54, which, in turn, is adapted to connect the wiper assembly 46 to the wiper arm 44. The wiper assembly 46 may also include an airfoil assembly, generally indicated at 56, to prevent the wiper assembly 46 from lifting away from the surface of the windshield 40. The wiper assembly 46 may still further include one or more end caps, generally indicated at 58 in FIG. 1, to prevent the airfoil assembly 56 from disengaging the support member 50.

The wiping element 48 is configured to a predetermined length corresponding to a particular application, and is often manufactured through an extrusion process, which enables the length of the wiping element 48 to be easily adjusted without a substantial increase in manufacturing expense. While the wiping element 48 is constructed from a flexible rubber, those having ordinary skill in the art will appreciate that the wiping element 48 could be constructed from any flexible material, such as silicone or another polymer, without departing from the scope of the present invention. The wiping element 48 typically includes head portion 48A and a wiping portion 48B (see FIGS. 5 and 6). The head portion 48A is operatively attached to the monolithic support member 50 with an adhesive, such as glue (not shown, but generally known in the art). However, it will be appreciated that wiping element 48 could be operatively attached to the support member 50 in any suitable way without departing from the scope of the present invention. The wiping portion 48B of the wiping element 48 is adapted to contact the surface to be wiped 40. As shown in FIGS. 5 and 6, the wiping portion 48B has a generally triangular, tapered profile. However, those having ordinary skill in the art will appreciate that the wiping portion 48B could have any suitable profile, shape, or configuration without departing from the scope of the present invention.

As noted above, the support member 50 is glued to the wiping element 48. Those having ordinary skill in the art will recognize this as a monolithic "beam blade" configuration. However, it will be appreciated that the wiping element 48 could be supported by or receive force distribution from different types and styles of support members 50 in different ways without departing from the scope of the present invention. Moreover, it will be appreciated that the wiper assembly 46 could employ one or more carriers (not shown, but generally known in the art) interposed between the support member 50 and wiping element 48 such that the support member 50 does not directly engage the wiping element 48.

The support member 50 may be constructed from a resiliently flexible material, such as spring steel or a polymer, and is adapted to apply force from an intermediate position between its longitudinal ends. More specifically, the support member 50 receives force from the spring loaded wiper arm 44 at an intermediate position and distributes this force across the span of the support member 50 toward its longitudinal ends. To that end, the support member 50 may be curved longitudinally with a predetermined radius of curvature. In the related art, this predetermined radius of curvature is sometimes referred to as a "free form" radius of curvature. Accordingly, the curvature of the support member 50 may be symmetrical or asymmetrical, depending on the force requirements of the application and the contour of the windshield 40. The flexible, free form, pre-curved support member 50 straightens out when the wiper arm 44 applies a force thereto to flatten the support member 50, and directs the wiping element 48 to contact the windshield 40. Thus, the elongated support member 50 includes a free-form curvature that ensures force distribution on windshields having various curvatures and that effects proper wrapping about the windshield 40.

As illustrated in FIGS. 5 and 6, the support member 50 may have a substantially constant width and a constant thickness throughout the length between the longitudinal ends of the support member 50. The constant width and thickness are adapted to provide high lateral and torsional stiffness so as to avoid lateral and torsional deflections, which cause the wiping element 48 to stick/slip ("chatter") on the windshield 40 during operation. Thus, the cross-section of the support member 50 has a generally rectangular outer profile that makes the support member 50 easier to manufacture. More specifically, where the support member 50 is constructed from metal, such as spring steel, the tools and machinery used to manufacture the support member 50 are less complicated than that required to manufacture one having varying widths and/or thickness. Furthermore, where the support member 50 is constructed from a polymer, such as a thermoplastic elastomer, the tools and extrusion process machinery are also less complicated than those employed to manufacture varying widths and/or thicknesses. However, those having ordinary skill in the art will appreciate that the support member 50 illustrated herein may include a varying thickness and/or width without departing from the scope of the present invention. Further, as mentioned above, those having ordinary skill in the art will appreciate that the support member 50 could be monolithic or a plurality of splines.

The support member 50 may include one or more securing features for cooperating with the coupler 52 to operatively attach the support member 50 to the coupler 52. Those having ordinary skill in the art will appreciate that the securing features could be of any suitable shape or configuration, or could be omitted entirely, without departing from the scope of the present invention. Specifically, those having ordinary skill in the art will appreciate that the coupler 52 could be fixed to the support member 50 in several different ways. By way of non-limiting example, the coupler 52 could be glued, welded, crimped, bolted, riveted, formed-over, locked, or otherwise fixed to the support member 50 without departing from the scope of the present invention As noted above, the wiper assembly 46 also typically includes at least one airfoil assembly 56 operatively mounted to the support member 50. The airfoil assembly 56 extends substantially along the length of the wiper assembly 46 and acts to reduce the likelihood of wind lift by allowing air to flow over the wiper assembly 46. More specifically, and in the embodiment illustrated herein, the airfoil assembly 56 is formed as two individual components operatively mounted to the support member 50, with the coupler 52 disposed between the airfoils 56. However, those having ordinary skill in the art will appreciate that the airfoil assembly 56 could be formed as any suitable number of individual components without departing from the scope of the present invention. By way of non-limiting example, the airfoil assembly 56 could be defined by a single unitary component, could be integrated with the wiping element 48, or could be omitted entirely.

While the wiper assembly 46 includes airfoils 56 with asymmetric, angled profiles that extend along a substantially constant cross-section, those having ordinary skill in the art will appreciate that the airfoils 56 could be formed differently without departing from the scope of the present invention. The airfoil assembly 56 is configured to a predetermined length corresponding to a particular application, and may be manufactured by an extrusion process. However, those having ordinary skill in the art will appreciate that the airfoil assembly 56 could be constructed in other ways, such as by an injection molding, without departing from the scope of the present invention. Moreover, those having ordinary skill in the art will appreciate that manufacturing by extrusion enables the length of the airfoil assembly 56 to be easily adjusted without a substantial increase in manufacturing expense. Further still, while the airfoil assembly 56 is constructed from plastic, those having ordinary skill in the art will appreciate that the airfoil assembly 56 could be constructed from any suitable material without departing from the scope of the present invention. Moreover, while the airfoil assembly 56 is extruded from a single material, those having ordinary skill in the art will appreciate that the airfoil assembly 56 could be formed from a plurality of materials, such as by co-extrusion, over-molding, skin coating, etc., without departing from the scope of the As previously noted, in the wiper assembly 46 of the present invention, the wiper assembly 46 includes the coupler 52 operatively attached to the support member 50. As illustrated in FIGS. 4-6, a representative coupler is shown wherein the coupler 52 has a base 62 with claws 64 (generally known in the art) to attach to the support member 50. In the embodiment illustrated herein, the coupler 52 is a unitary, one piece component. However, those having ordinary skill in the art will appreciate that the coupler 52 could be designed as a plurality of components that interlock or otherwise cooperate to operatively attach to the support member 50, without departing from the scope of the present invention. The coupler 52 is typically constructed from plastic and is formed using an injection molding process. However, those having ordinary skill in the art will appreciate that the coupler 52 could be constructed from any suitable material formed using any suitable process without departing from the scope of the present invention.

As noted above, the coupler 52 is configured to secure the adapter 54 which, in turn, is configured to releasably attach to the wiper arm 44. In the representative embodiment illustrated herein, the base 62 of the coupler 52 supports a saddle, generally indicated at 66, interposed between the coupler 52 and the adapter 54. The saddle 66 includes side walls 67, which include opposing cylindrical trunnion bores 68 configured to pivotally engage the adapter 54 to facilitate improved connection to the wiper arm 44, as is discussed more thoroughly below. However, those having ordinary skill in the art will appreciate that the coupler 52 could be connected to the adapter 54 in any suitable way without departing from the scope of the present invention. By way of non-limiting example, the adapter 54 could be pivotally coupled directly to the coupler 52 without the use of the saddle 66. However, it will be appreciated that the inclusion of the saddle 66 between the adapter 54 and the coupler 52 enables the wiper assembly 46 to be fitted with various inventive adapters 54 as disclosed further herein so as to releasably engage the wiper arm 44.

As mentioned above, the adapter 54 of the present invention is configured to be operatively attached to a wiper assembly 46. In one embodiment, the adapter 54 is pivotally attached to the saddle 66 formed with the coupler 52.

As noted above, the adapter 54 is configured to releasably attach to the wiper arm 44. Specifically, as disclosed herein, various embodiments of the adapter 54 of the present invention are configured to releasably attach the wiper assembly 46 to the wiper arm 44, which is described more thoroughly below. Typically, the adapter 54 is formed separately from the wiper arm 44 and is then operatively attached thereto, such as by crimping or welding.

In more detail, the present invention relates, generally, to wiper systems and, more specifically, to embodiments for the adapter 54 which are usable with various types of couplers 52. Often, known wiper blade assemblies uses one additional component known as a connector part of the wiper arm assembly 46 that is used to retain the wiper blade. This invention allows removal of the connector component from the wiper arm 44 and instead replaces it with retention features formed on a front end of the wiper arm or wiper arm rod 44. The blade assembly 46 is equipped with an adapter that mates with the arm rod geometry to secure itself together.

In more detail, the wiper arm 44 preferably has a common construction as used with the adapter embodiments disclosed herein, although it will be understood that the specific geometry of the wiper arm 44 may be varied. Referring to FIG. 3, the wiper arm 44 preferably is formed with a constant thickness defined by opposite arm faces 71 and 72 and opposite edge faces 73 and 74, which define a generally rectangular cross section along the substantial majority of the arm length.

The front end 75 of the wiper arm 44 terminates at an end face 76 with the edge face 73 extending to such end face 76. The opposite edge 74 is formed with retention features generally configured with a first formation 78 and second formation 79, which may be axially spaced along the arm axis and may be formed as rectangular notches.

Preferably, the first notch formation 78 has side faces 78A and 78B that define the axial width thereof, and a bottom face 78C that defines a depth thereof. Similarly, the second notch formation 79 is defined axially by the side faces 79A and 79B and has a depth defined by bottom face 79C. Generally, the first notch formation 78 is axially larger and is deeper than the second notch formation 79. Further, the notch side face 79B is smaller than notch side face 79A to define a step 80, which in turn transitions axially into a narrower recess 81 that extends to the end face 76.

At the corner between the end face 76 and recess 81, an inclined face 82 is formed similar to a chamfer. The junction between the step 80 and recess 81 may preferably be provided with an inclined side face 83. The front end 75 of the wiper arm 44 is configured to fit releasably into the adapter 54, the first embodiment of which is identified by reference numeral 85 in FIGS. 2-6.

As seen in FIGS. 2-5, the adapter 85 has a U-shape when viewed in cross-section that is defined by adapter side walls 86 and top wall 87, which define an adapter slot 88. The adapter slot 88 opens from one end of the adapter 85 and receives the front end 75 of the wiper arm 44 therein. The adapter slot 88 has a smooth side that slidably contacts the arm edge face 73 during arm insertion and an opposite side that is formed with a pair of adapter pads 89 and 90 that are sized to fit closely into engagement with the first and second notch formations 78 and 79 respectively. When engaged, the wiper arm 44 is prevented from being pulled out of the adapter slot 88. To permit such engagement when the wiper arm 44 is inserted in the adapter slot 88, the adapter side walls 86 and top wall 87 preferably are formed of a resiliently deflectable material such as plastic that allows the U-shape to deflect when the inclined arm face 82 presses or spreads the side walls 86 outwardly. Since the second notch formation 79 is smaller than the first notch formation 78, the adapter pads 89 and 90 are similarly sized such that the larger adapter pad 89 cannot slide into the second notch formation 79 but only seats in the first notch formation 78 when the smaller adapter pad 90 aligns with and seats in the second notch formation 79.

The wiper arm 44 is pre-assembled to the adapter 85 as seen in FIG. 6. The adapter 85 also includes downwardly depending side wall sections 92 and 93 that fit between the coupler side walls 67 and include trunnions 95 that seat within the trunnion bores 68 so that the adapter 85 may pivot relative to the coupler 52. To dismount the adapter 85 from the coupler 52, the side wall sections 92 and 93 also include a respective side tab 96 that can be manually squeezed together to deflect the side wall sections 92 and 93 inwardly and unseat the trunnions 95 from their respective trunnion bores 68.

To remove the wiper arm 44 from the adapter 85, the side walls 86 are resilient deflectable and can be manually separated to disengage the adapter pads 89 and 90 from their respective notch formations 78 and 79 and allow the wiper arm front end 75 to be pulled out of the adapter slot 88. As such, the adapter 85 incorporates resiliently deflectable components that allow insertion of the wiper arm 44 into releasable engagement with the adapter 85.

Next, FIG. 7 is an exploded perspective view of a second embodiment of an adapter usable with the wiper arm 44, which is identified by reference numeral 100. This embodiment preferably has the adapter 100 formed from sheet metal. FIG. 8 is a perspective view thereof after assembly of the wiper arm 44 to the adapter 100 of FIG. 7. In FIGS. 7-10, a representative coupler 101 is shown, which is similar to the coupler 52 and supports a wiper assembly 46 in essentially the same manner as disclosed above. As such, a detailed discussion of the coupler 101 is not required for an understanding of the present invention. For the remaining embodiments, the construction of a coupler is not required for an understanding of the present invention, such that specific disclosures of the couplers are also omitted herein.

The adapter 100 has a U-shape when viewed from an end that is defined by adapter side walls 102 and top wall 103, which define an adapter slot 104. The adapter slot 104 opens from at least one end of the adapter 100 and receives the front end 75 of the wiper arm 44 therein. The adapter slot 104 has a smooth side 105 that slidably contacts the arm edge face 73 during arm insertion and an opposite side 106 that has an end portion 107 that closely faces the other arm edge face 74. The slot side 106 also includes a cantilevered retention lock 108 that is formed with a pair of adapter lock tabs 109 and 110 that function similar to adapter pads 89 and 90. The lock tabs 109 and 110 deflect or displace outwardly with the retention lock 108 during insertion of the wiper arm 44 into the adapter slot 104, and then reverse directions and seat within the respective notch formations 78 and 79 in the wiper arm 44.

The lock tabs 109 and 110 are sized to fit into engagement with the first and second notch formations 78 and 79 respectively to prevent removal of the wiper arm 44. When engaged, the wiper arm 44 is prevented from being pulled out of the adapter slot 104.

When the wiper arm 44 is inserted into the adapter slot 104, the retention lock 108 deflects outwardly when the lock tab 109 first contacts the inclined face 83, after which the retention lock 108 remains deflected as the second lock tab 110 subsequently contacts the inclined face 83. Once the lock tabs 109 and 110 align axially with the notch formations 78 and 79, the retention lock 108 returns to its undeflected condition, which seats the lock tabs 109 and 110 into the notch formations 78 and 79 as shown in FIG. 9. Essentially, the retention lock 108 is a spring lock that moves in response to axial insertion of the wiper arm 44 into the adapter slot 104.

The wiper arm 44 is pre-assembled to the adapter 100 as seen in FIG. 8. To release the wiper arm 44 for removal thereof, the free end of the retention lock 108 includes a finger tab 112 that can be pulled outwardly to disengage the lock tabs 109 and 110 from the notch formations 78 and 79.

To secure the adapter 100 to the coupler 101, the adapter 100 also includes downwardly depending side wall sections 114 and 115 that fit outside of the coupler side walls 116 and include rivets that fit in holes to define trunnions 117 that seat within the trunnion bores formed in the coupler side walls 116 so that the adapter 100 may pivot relative to the coupler 101.

To remove the adapter 100 from the coupler 101, the side wall sections 114 and 115 are resiliently deflectable and can be manually separated to disengage the trunnions and allow the adapter 110 to be removed from the coupler 101. Similarly, the retention locks 108 are resiliently deflectable and can be pulled apart so that the wiper arm front end 75 can be pulled out of the adapter slot 104. Here again, the adapter 100 incorporates resiliently deflectable components that allow insertion of the wiper arm 44 into releasable engagement with the adapter 100.

FIG. 11 is an exploded perspective view of a third embodiment of an adapter 120 usable with the wiper arm 44, which is similar to adapter 100. The following disclosure uses common numerals for common parts, with the discussion focusing on the primary differences between the two adapters 100 and 120.

Here again, this embodiment preferably has the adapter 120 formed from sheet metal. FIG. 12 is a perspective view thereof after assembly of the wiper arm 44 to the adapter 100 of FIG. 11. In FIGS. 11-14, the representative coupler 101 is shown which is similar to the coupler 52 and supports a wiper assembly 46 in essentially the same manner as disclosed above. As such, a detailed discussion of the coupler 101 is not required for an understanding of the present invention.

Like adapter 100, the adapter 120 has a U-shape when viewed from an end that is defined by adapter side walls 102 and top wall 103, which define an adapter slot 104. The adapter slot 104 opens from at least one end of the adapter 100 and receives the front end 75 of the wiper arm 44 therein. The adapter slot 104 has a smooth side 105 that slidably contacts the arm edge face 73 during arm insertion and an opposite side 106 that has an end portion 107 that closely faces the other arm edge face 74. The slot side 106 also includes a cantilevered retention lock 121 that is formed substantially same as retention lock 108 except that the retention lock 121 is reversed so as to flex from the opposite end. The retention lock 121 includes a pair of adapter lock tabs 109 and 110 that deflect outwardly with the retention lock 121 during insertion of the wiper arm 44 into the adapter slot 104, and then seat with the respective notch formations 78 and 79 in the wiper arm 44.

The lock tabs 109 and 110 are sized to fit into engagement with the first and second notch formations 78 and 79 respectively to prevent removal of the wiper arm 44. When engaged, the wiper arm 44 is prevented from being pulled out of the adapter slot 104.

When the wiper arm 44 is inserted into the adapter slot 104, the retention lock 121 deflects outwardly when the lock tab 109 first contacts the inclined face 83, after which the retention lock 108 remains deflected as the second lock tab 110 subsequently contacts the inclined face 83. Once the lock tabs 109 and 110 align axially with the notch formations 78 and 79, the retention lock 121 returns to its undeflected condition, which seats the lock tabs 109 and 110 into the notch formations 78 and 79 as shown in FIG. 13. Essentially, the retention lock 121 is a spring lock that moves in response to axial insertion of the wiper arm 44 into the adapter slot 104.

The wiper arm 44 is pre-assembled to the adapter 100 as seen in FIG. 12. To release the wiper arm 44 for removal thereof, the free end of the retention lock 121 includes a finger tab 112 that can be pulled outwardly to disengage the lock tabs 109 and 110 from the notch formations 78 and 79.

As such, the adapters 100 and 120 are structurally and functionally the same except that the orientations of the retention locks 108 and 121 are reversed.

FIG. 15 is a further perspective view of the wiper arm 44. In more detail, the wiper arm 44 preferably is formed with a constant thickness defined by opposite arm faces 71 and 72 and opposite edge faces 73 and 74, which define a generally rectangular cross section along the substantial majority of the arm length.

The front end 75 of the wiper arm 44 terminates at the end face 76 with the edge face 73 extending to such end face 76. The opposite edge 74 is formed with retention features generally configured with a first formation 78 and second formation 79, which may be formed as rectangular notches.

As described above, the first notch formation 78 is axially larger and is deeper than the second notch formation 79. Further, the step 80 is defined, which in turn transitions axially into a narrower recess 81 that extends to the end face 76. At the corner between the end face 76 and recess 81, the inclined face 82 is formed similar to a chamfer. The junction between the step 80 and recess 81 may preferably be provided with an inclined side face 83.

This wiper arm 44 is also shown in FIG. 16, wherein FIG. 16 is a perspective view of a fourth embodiment of an adapter 130 with the components in a first orientation. The adapter 130 is configured like a key tumbler and has a main body 131 formed as a cylinder that defines an adapter slot 132 into which the wiper arm 44 may be inserted.

The wiper arm 44 is pre-assembled to the adapter 130 as seen in FIGS. 16-18 and the adapter 130 is also mountable to a coupler 133 like the coupler 52 disclosed above. In the representative embodiment illustrated herein, the base 134 of the coupler 133 supports a saddle, generally indicated at 134, interposed between the coupler 133 and the adapter 130. The saddle 134 includes side walls 135, which include opposing cylindrical trunnion bores configured to pivotally engage the adapter 130. The adapter 130 fits between the coupler side walls 134 and include trunnions 137 (see FIG. 22) that seat within the trunnion bores so that the adapter 130 may pivot relative to the coupler 133.

As seen in FIG. 16, the front end 73 is inserted into the adapter slot 132, wherein the adapter geometry prevents the arm from being inserted in the wrong orientation. Then, FIG. 17 is a perspective view of the adapter 130 with the components in a second orientation and the wiper arm in an unlocked orientation for insertion. The wiper blade 44 is then rotated clockwise as indicated by reference arrow 138 until the wiper blade 44 is rotated to a locked orientation or position as seen in FIG. 18. As will be understood from the following disclosure, the wiper blade 44 may again be rotated counterclockwise for removal of the wiper blade 44 from adapter 130. Generally, the adapter geometry includes features defining a retention lock structure that locks the wiper arm 44 within the adapter slot 132 and features defining a rotation lock structure that prevents rotation of the wiper arm 44 until released, after which the wiper arm 44 can be rotated back to the unlocked orientation of FIG. 17.

In more detail as to FIGS. 19-22, the adapter 130 includes an annular outer wall 140 that defines a hollow interior, which forms the adapter slot 132. The adapter slot 132 comprises an end section 141, which receives the front end 73 of the wiper arm 44, a locking section 142, and an entry section 143 at the open end thereof. The wiper arm 44 is able to rotate within the adapter slot 132 as described below.

Figure 21:
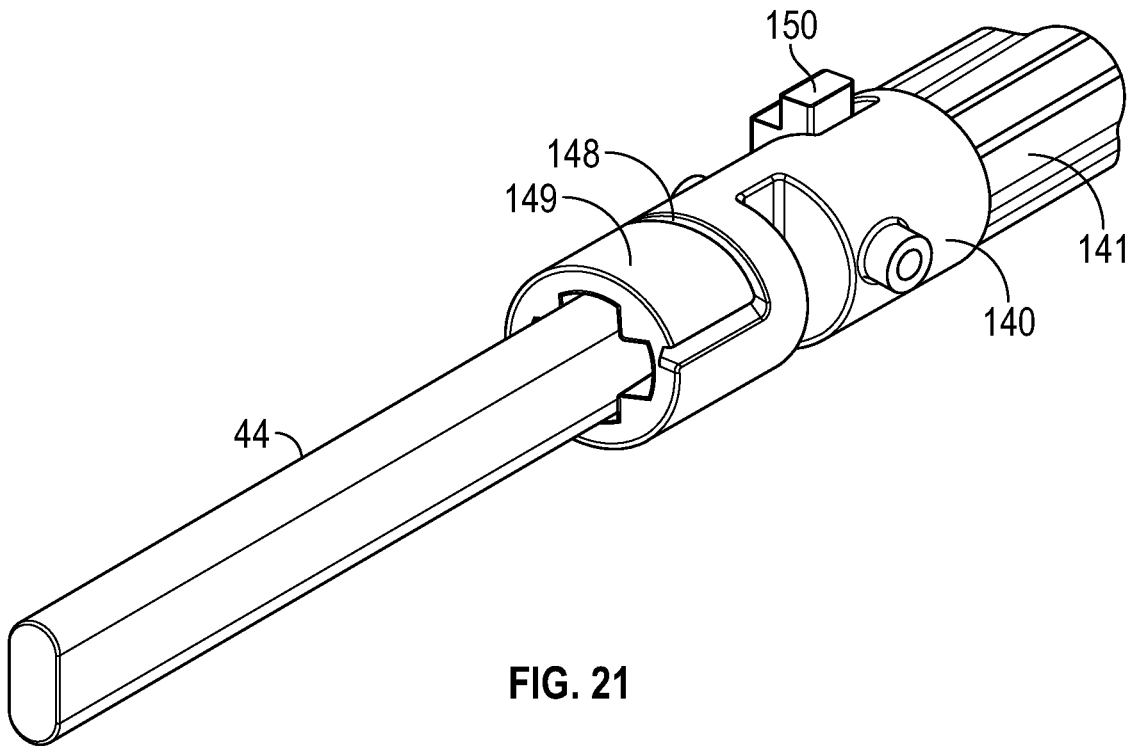
FIG. 21 is a perspective view showing the wiper arm in the unlocked orientation.
Figure 22:
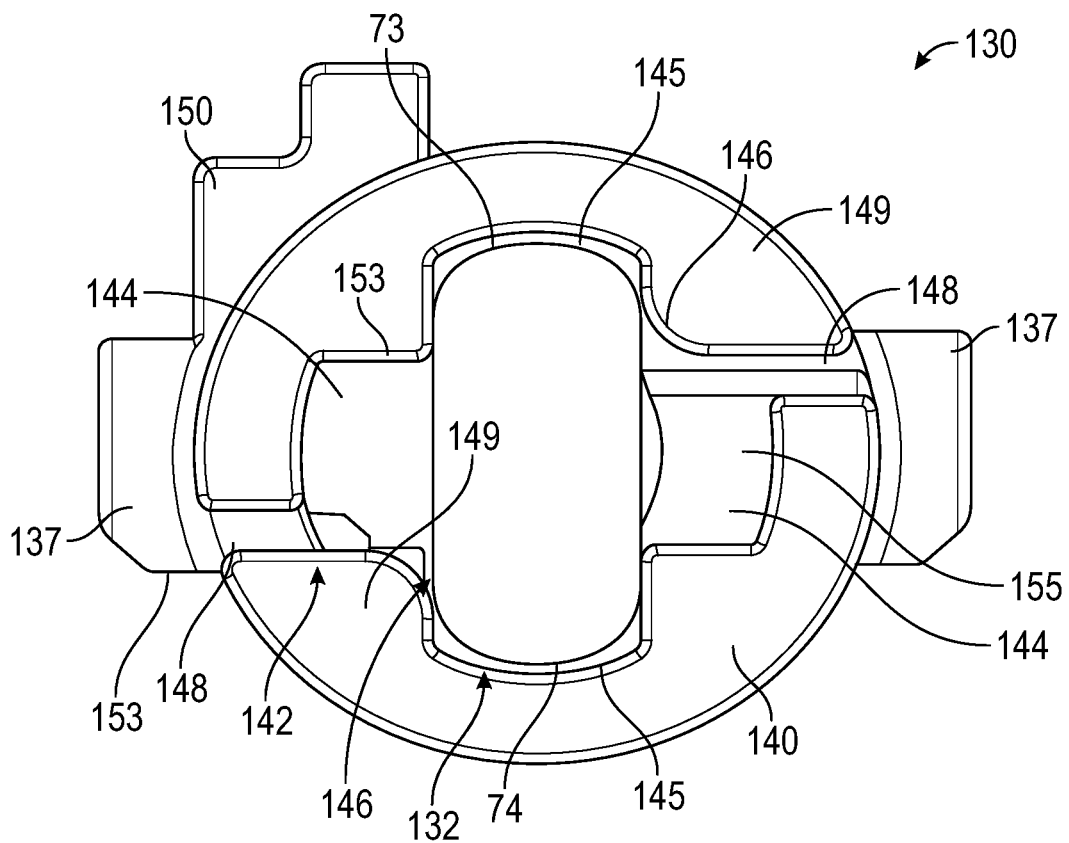
FIG. 22 is an end view thereof.
Figure 23:
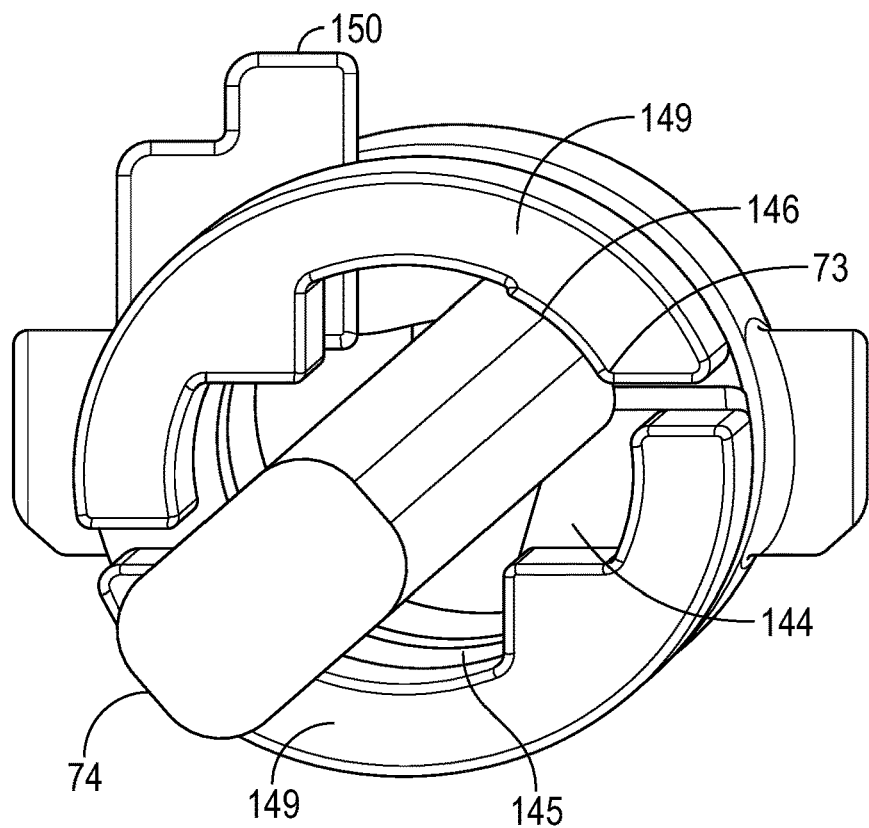
FIG. 23 is an end perspective view showing the wiper arm being rotated to the locked orientation.
Figure 24:
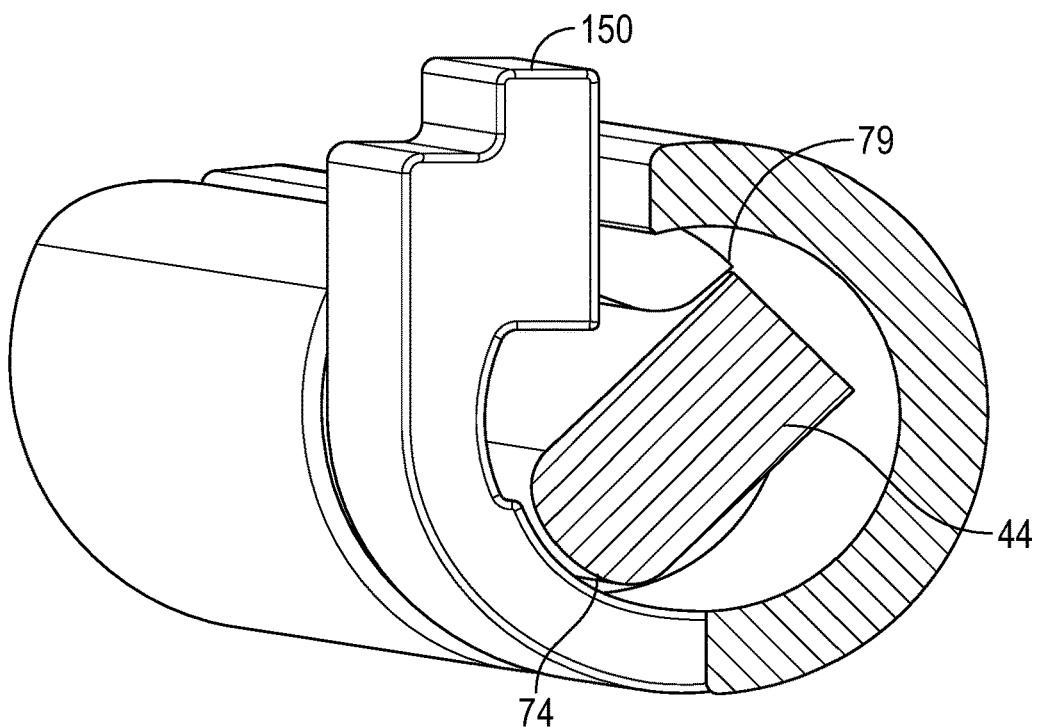
FIG. 24 is a cross-sectional perspective view thereof.

The entry section 143 has a plus shaped geometric shape defined by two pairs of opposed edge grooves 144 and 145. The wiper arm 44 is first inserted into the pair of grooves 145 as seen in FIGS. 17, 21 and 22, and then is rotated such that the arm edges 73 and 74 move from the grooves 145 to the other pair of grooves 144. The transition between the grooves 145 and 144 define arcuate corners 146, wherein L-shaped separation slots 148 are provided to form resiliently deflectable wall sections 149 (see FIGS. 21 and 22). The wall sections 149 essentially are cantilevered since they have three unrestrained edges and can deflect along the remaining side edge. As best seen in FIG. 23, rotation of the wiper arm 44 causes the arm side edges 73 and 74 to rotate along the arcuate corners 146 which causes some deflection of the wall sections 149. As the wiper arm 44 rotates from side grooves 144 to grooves 145, the wiper arm 44 essentially snaps over from one pair of grooves 144 to the other grooves 145 and then is restrained therein since the resiliency of the wall portions 149 resists but does not prevent blade rotation.

Figure 25:
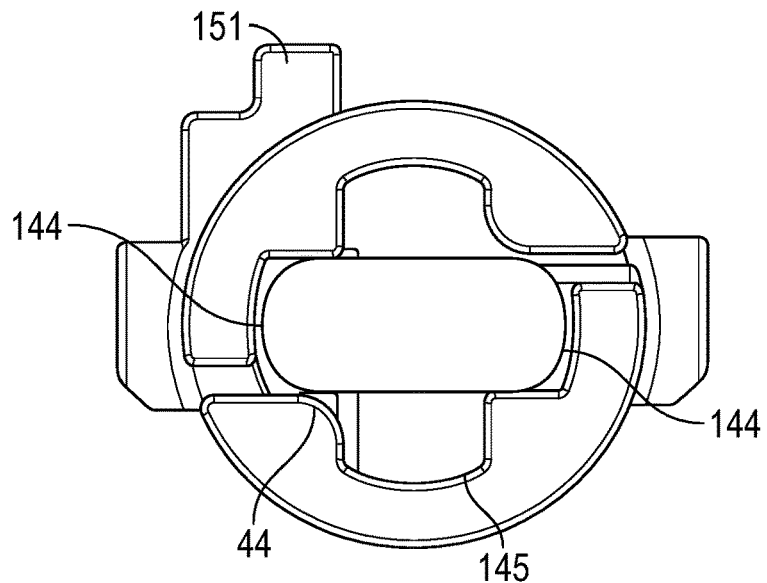
FIG. 25 is an end view showing the wiper arm rotated to the locked condition.
Figure 26:
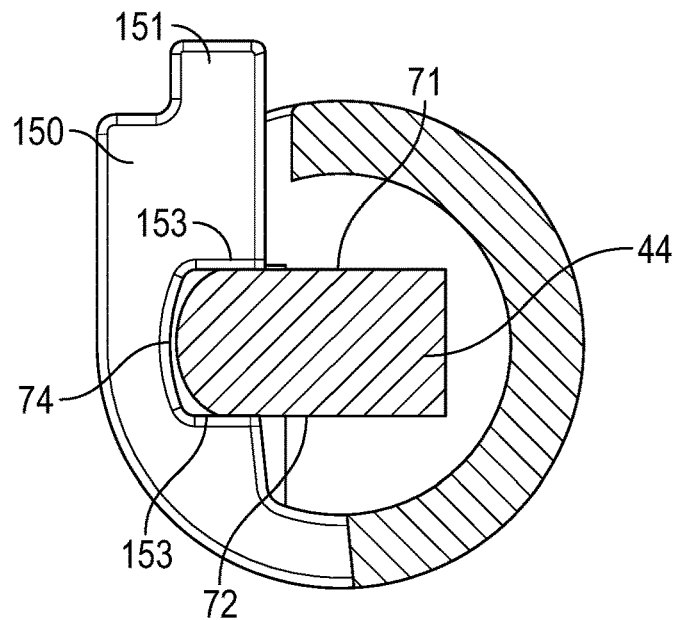
FIG. 26 is a cross sectional end view thereof.

To lock out rotation, a cantilevered lock arm 150 is provided that engages with the wiper arm edge 74 to restrain arm rotation as shown by FIGS. 25 and 26. The lock arm 150 serves as a rotation lock and has a free end 151 and a deflectable end 152 joined to the adapter wall 140. The lock arm 150 includes a lock notch defined by side faces 153, which receives the wiper arm edge 74 therein. The side faces 153 fit closely by the arm faces 71 and 72 and prevent wiper arm rotation when in the locked condition of FIG. 26. However, the free end 151 can be manually pushed outwardly which bends the lock arm 150 away from the wiper edge 74 and releases the wiper arm 44 to allow rotation thereof.

Figure 27:
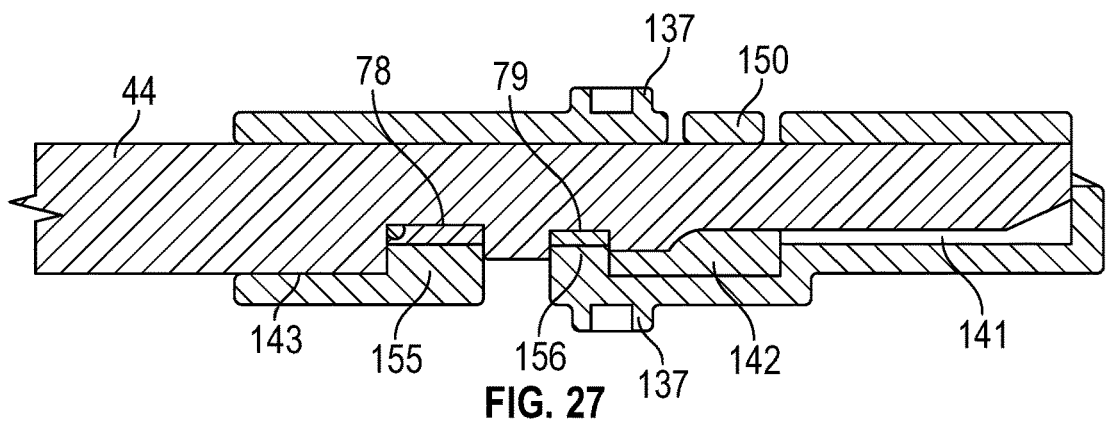
FIG. 27 is a cross sectional top view thereof.
Figure 28:
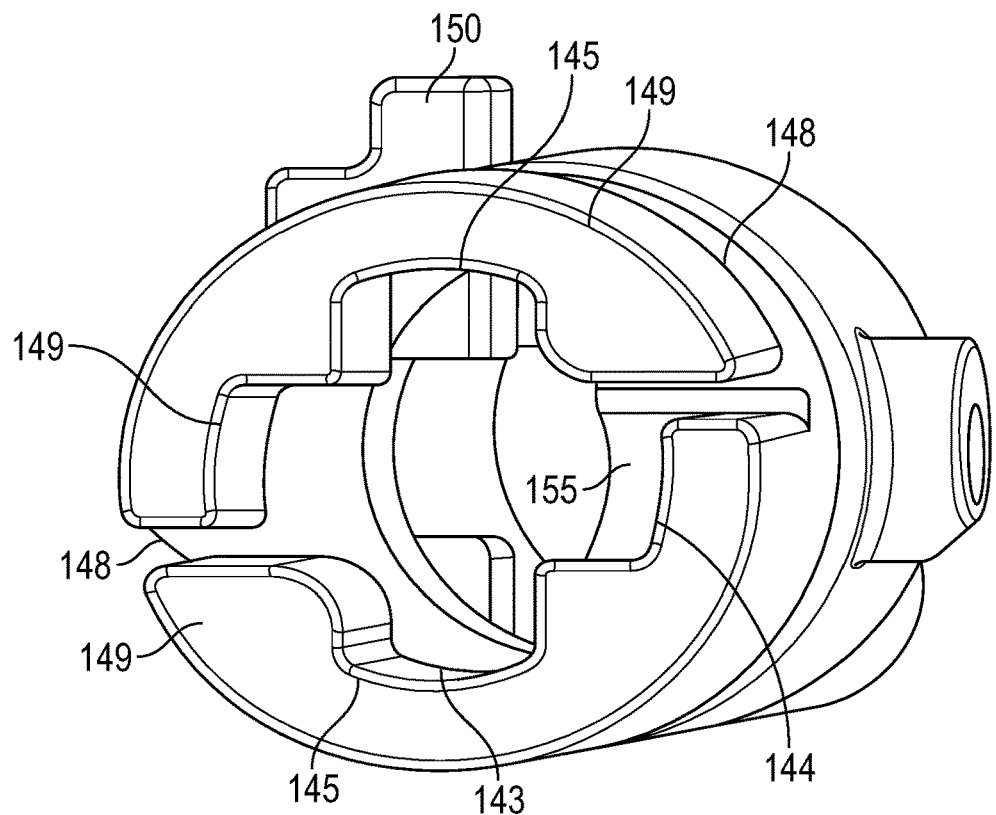
FIG. 28 is a perspective view of the adapter without the wiper arm.
Figure 29:
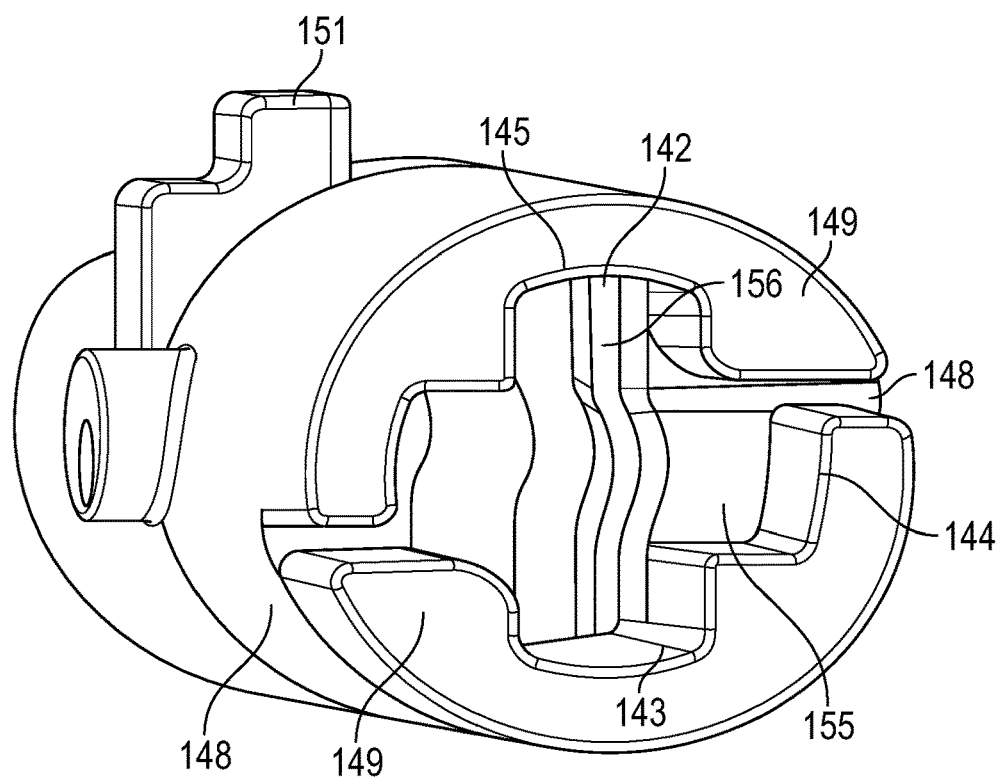
FIG. 29 is an alternate perspective view of the adapter without the wiper arm.

When the wiper arm 44 is rotated to the locked condition of FIGS. 18, 25 and 26, the wiper arm 44 is also retained axially within the adapter slot 132. As seen in FIGS. 27 and 29, the locking section 142 of slot 132 includes first and second locking pads 155 and 156 that seat within the notch formations 78 and 79 of wiper arm 44 to prevent axial movement of the wiper arm 44. When the wiper arm 44 is rotated back to the unlocked condition of FIGS. 17 and 19-20, the notch formations 78 and 79 rotate from and out of engagement with the locking pads 155 and 156.

In this manner, the adapter 130 includes both a retention lock by the pads 155 and 156 and a rotation lock by the lock arm 150. Therefore, the adapter 130 is locked by two displacements of the wiper arm 44, namely axial displacement into the slot 132 and then rotation of the wiper arm 44 to the locked orientation.

Figure 30:
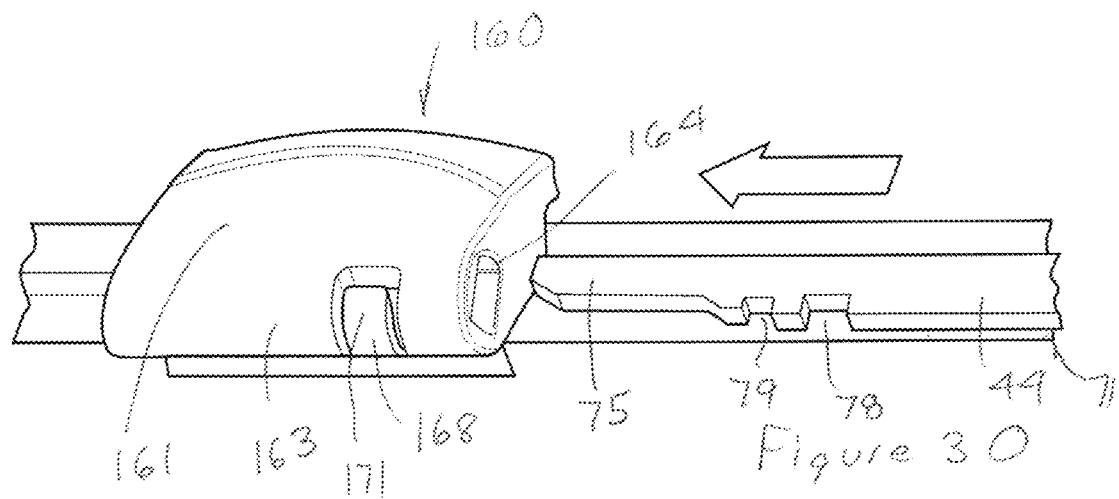
FIG. 30 is a perspective view of a fifth embodiment of an adapter.
Figure 31:
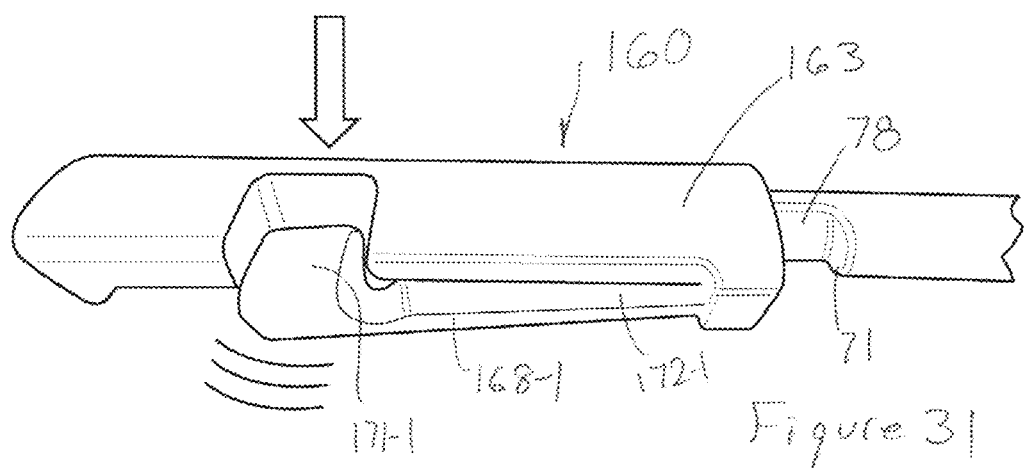
FIG. 31 is a right side perspective view showing the adapter of FIG. 30 being unlocked.
Figure 32:
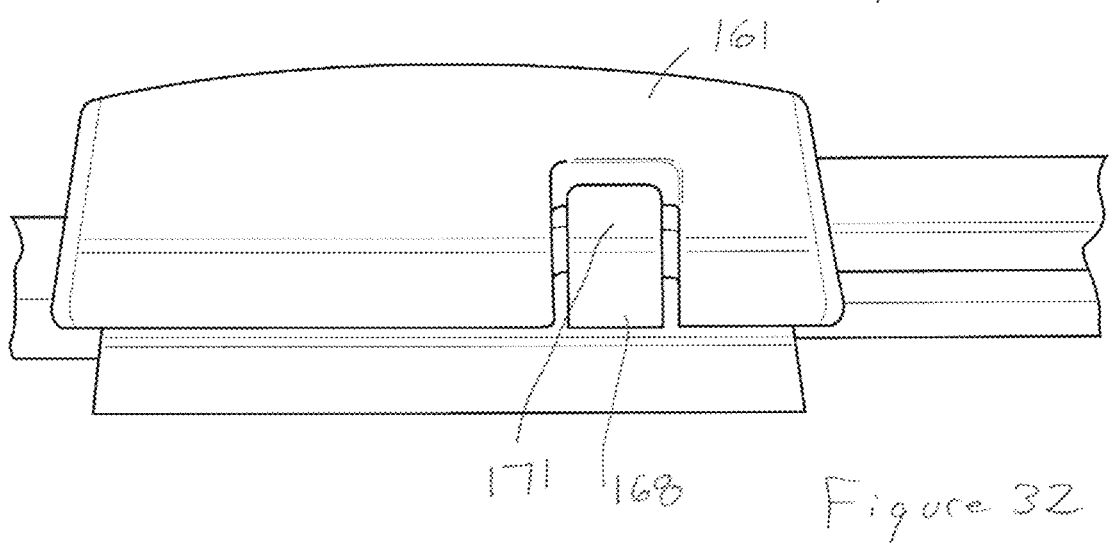
FIG. 32 is a front side perspective view thereof.

Next, FIGS. 30-32 illustrate a fifth embodiment of an adapter usable with the wiper arm 44, which is identified by reference numeral 160. This embodiment preferably has the adapter 160 formed with a molded body having a contoured aerodynamic upper surface 161. The bottom 162 (see FIG. 33) of the adapter 160 is configured to mount to a suitable coupler like representative couplers 52 or 101. As such, a detailed discussion of the coupler 52 or 101 is not required for an understanding of the present invention.

The adapter 160 has an adapter side wall 163, which defines an adapter slot 164. The adapter slot 164 opens from at least one end of the adapter 160 and receives the front end 75 of the wiper arm 44 therein. The adapter slot 164 has a smooth side 165 that slidably contacts the arm edge face 73 during arm insertion and an opposite side 166 that has an end portion 167 that closely faces the other arm edge face 74.

Figure 33:
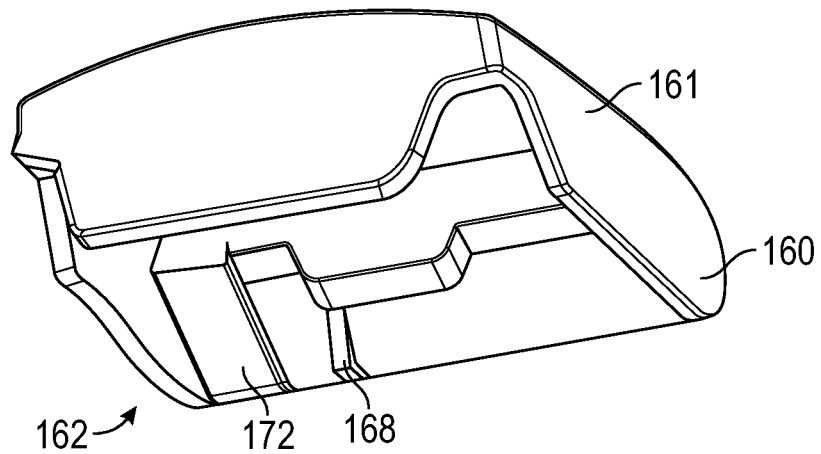
FIG. 33 is a rear perspective view thereof.
Figure 34:
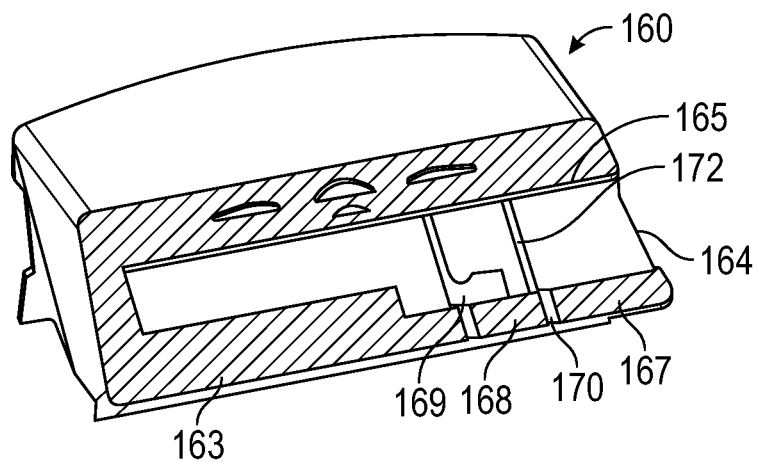
FIG. 34 is cutaway view thereof.
Figure 35:
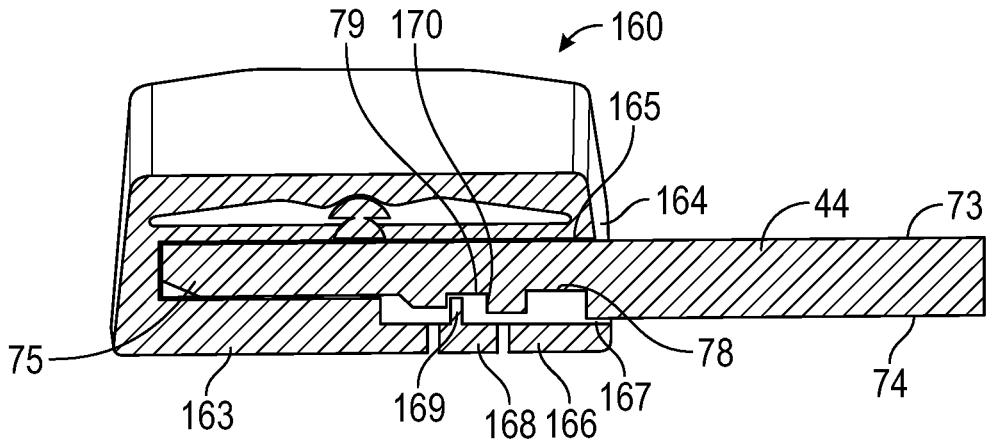
FIG. 35 is a side cross sectional view thereof.

The side wall 163 also includes a cantilevered retention lock 168 that is formed with at least one lock tab 169 that fits into one and preferably into the leading notch formation 79. The lock tab 169 has an inclined surface 170 that slides along the wiper arm face 71 and deflects during insertion of the wiper arm 44 into the adapter slot 164. When aligned, the lock tab 169 seats within the respective notch formations 79 in the wiper arm 44, and when engaged, the wiper arm 44 is prevented from being pulled out of the adapter slot 164. The retention lock 168 also includes an exposed button 171 that can be pressed to disengage the lock tab 169 from the notch formation 79. The retention lock 168 also has a lock body 172 that connects to the wall 163 in cantilevered relation so as to be resiliently deflectable. The lock body 172 may be relatively short as seen in FIG. 33 or relatively long as seen in FIG. 31 wherein the retention lock 168-1 has the lock body 172-1 extending a longer distance along the edge of the adapter 160.

Here again, the adapter 160 incorporates resiliently deflectable components that allow insertion of the wiper arm 44 into releasable engagement with the adapter 160.

Figure 36:
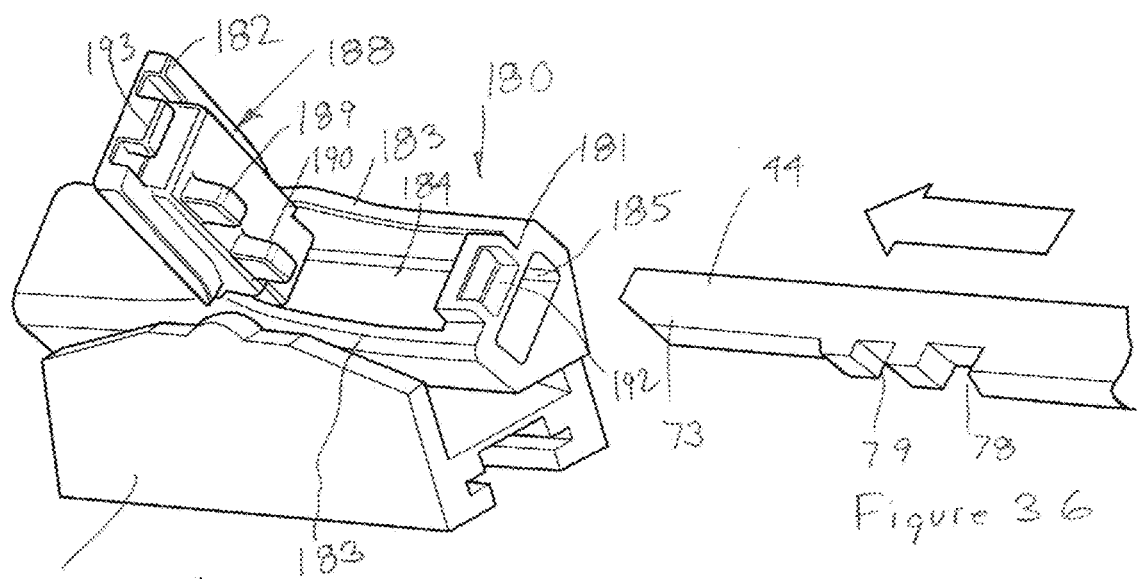
FIG. 36 is a perspective view of a sixth embodiment of an adapter with a retention lock formed as a pivotable cover.
Figure 37:
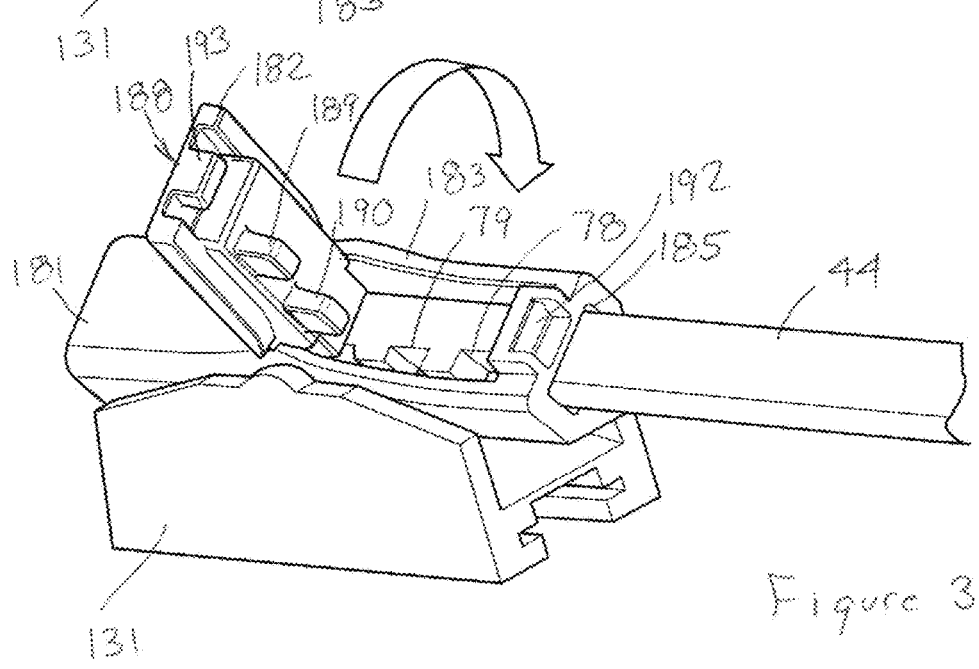
FIG. 37 is a perspective view showing the adapter with the wiper arm.
Figure 38:
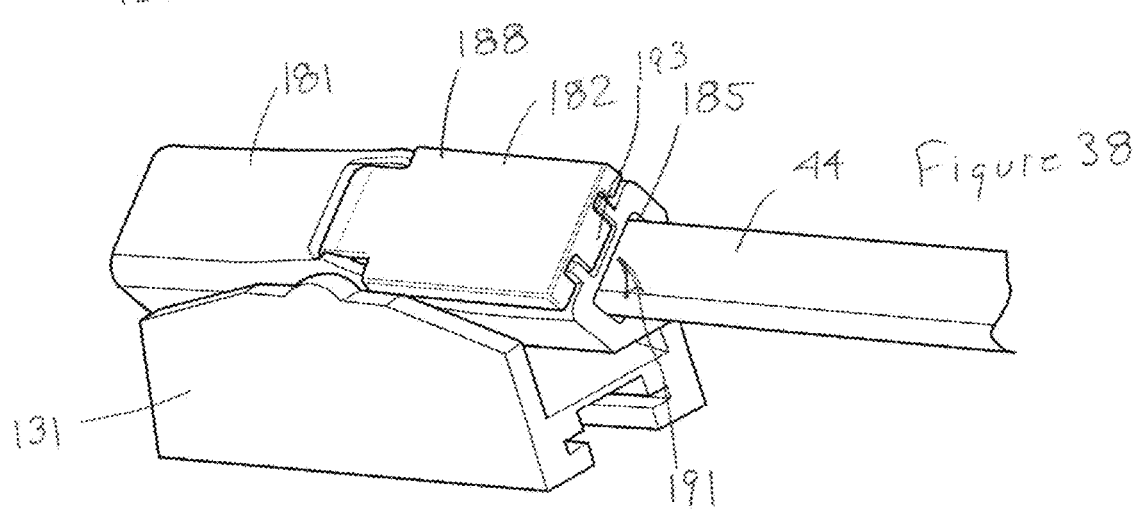
FIG. 38 is a front side perspective view showing the cover closed.

Next, FIGS. 36-38 show a sixth embodiment of an adapter usable with the wiper arm 44, which is identified by reference numeral 180. In FIGS. 36-38, a representative coupler 131 is shown, which coupler 131 is disclosed above. As such, a detailed discussion of the coupler 131 is not required for an understanding of the present invention.

The adapter 180 has a main body 181, which supports a pivoting cover 182. The main body 181 has a U-shape when viewed from an end that is defined by adapter side walls 183 and bottom wall 184, which define an adapter slot 185. The adapter slot 185 opens from at least one end of the adapter 180 and receives the front end 75 of the wiper arm 44 therein. The adapter slot 185 has smooth sides as defined by the side walls 183 that slidably contacts the arm edge faces 73 and 74 during arm insertion.

Figure 39:
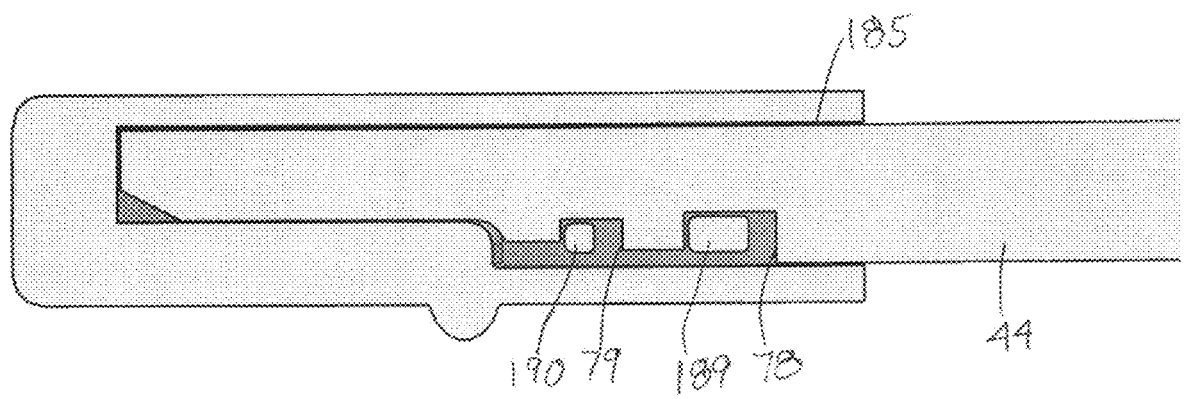
FIG. 39 is a top cross sectional view thereof.
Figure 40:
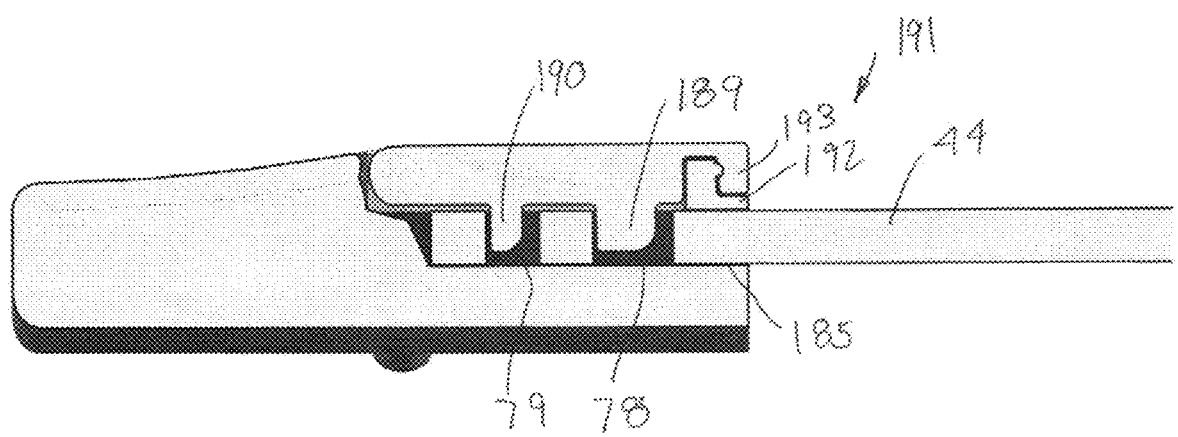
FIG. 40 is a side cross sectional view thereof.

In this embodiment, the cover 182 serves as a pivotable retention lock 188 that is formed with a pair of adapter lock tabs 189 and 190 that are rotated outwardly with the retention lock 188 during insertion of the wiper arm 44 into the adapter slot 185, and then seat with the respective notch formations 78 and 79 in the wiper arm 44 when the cover 182 is closed (see FIGS. 38-40).

The lock tabs 189 and 190 are sized to fit into engagement with the first and second notch formations 78 and 79 respectively to prevent removal of the wiper arm 44. When engaged, the wiper arm 44 is prevented from being pulled out of the adapter slot 185.

To hold the cover closed, a resilient lock 191 is provided which comprises a bridge 192 and a catch 193, which snap lockingly engage with each as the cover 182 is closed.

Still further, FIGS. 41-46 disclose a seventh embodiment of the present invention. An adapter 200 is shown in combination with the wiper arm 44. The adapter 200 comprises a main body, which forms an adapter slot 201. In more detail, the main body comprises a bottom wall 202, which includes lock tabs 203 and 204 for engaging the notch formations 78 and 79 of the wiper arm 44 in accord with the foregoing disclosure.

Figure 41:
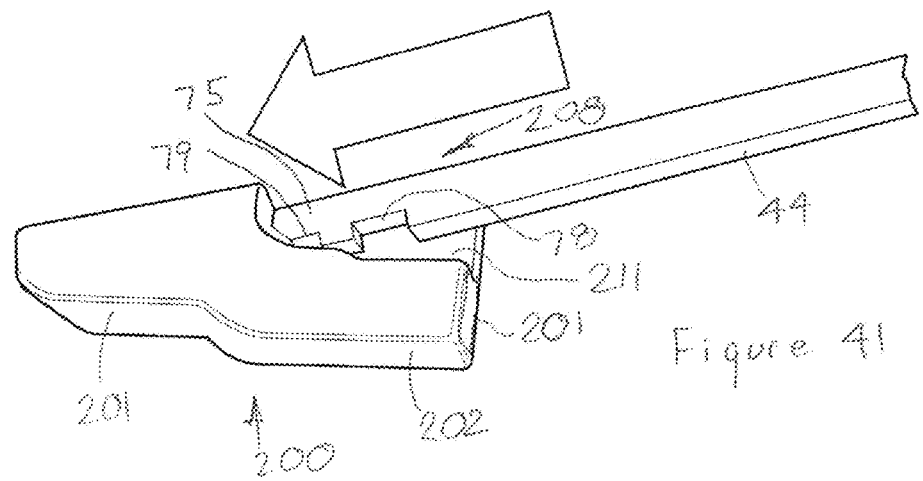
FIG. 41 is a perspective view of a seventh embodiment of an adapter with a retention lock and a deflectable stop.
Figure 42:
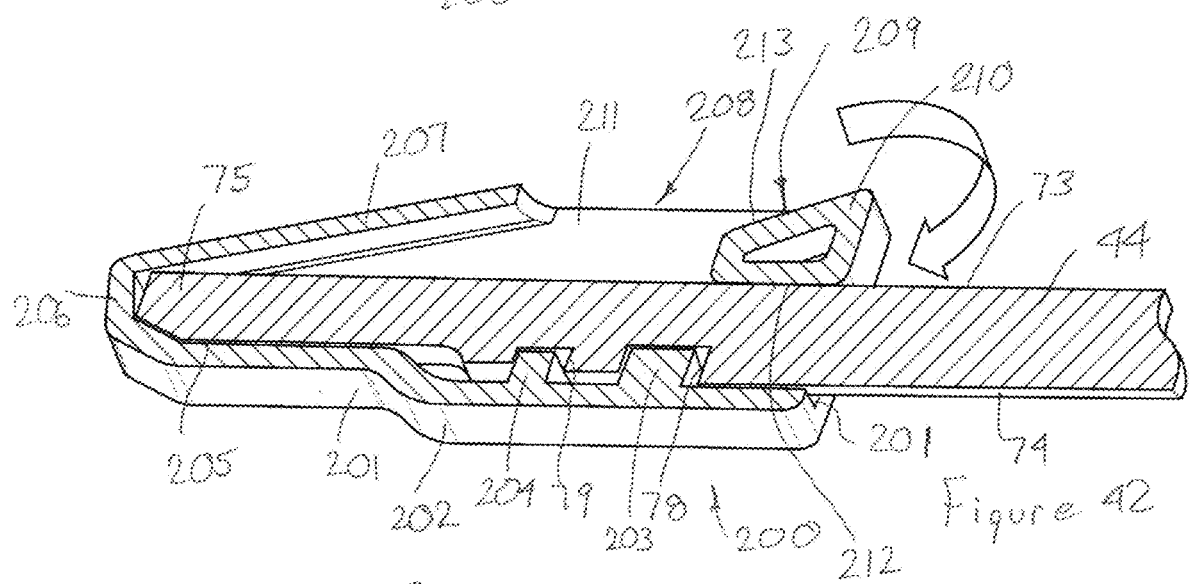
FIG. 42 is a cross sectional perspective showing the adapter with the wiper arm.
Figure 43:
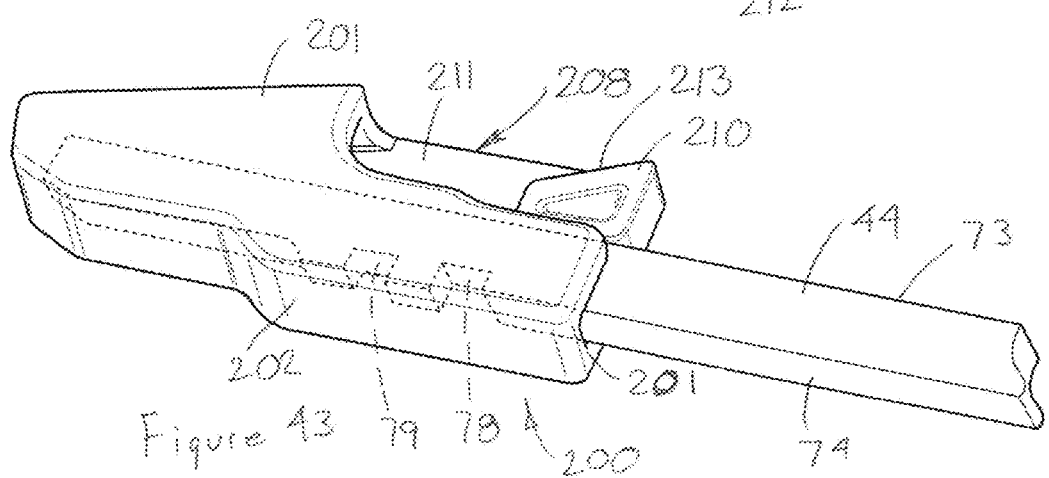
FIG. 43 is a front side perspective view thereof.
Figure 44:
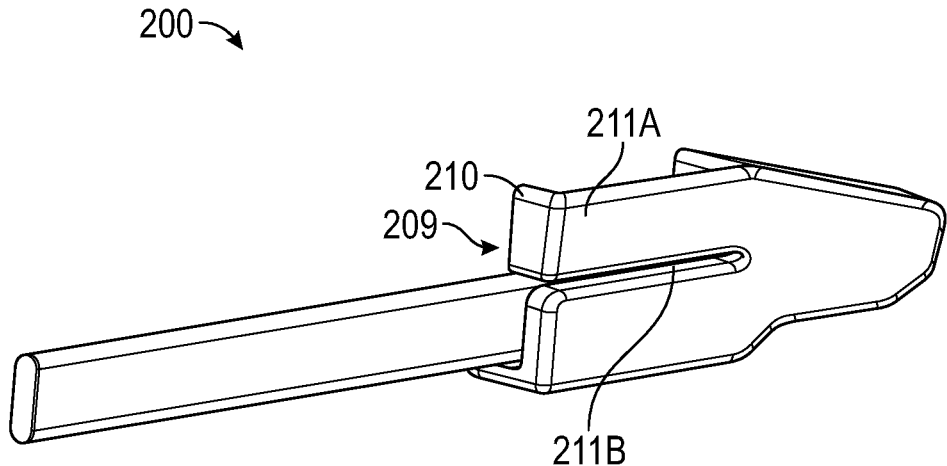
FIG. 44 is a rear side perspective view thereof.
Figure 45:
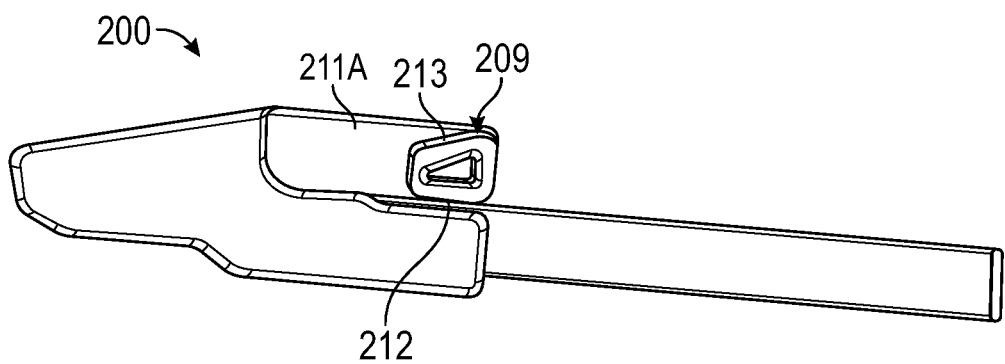
FIG. 45 is a front view thereof.
Figure 46:
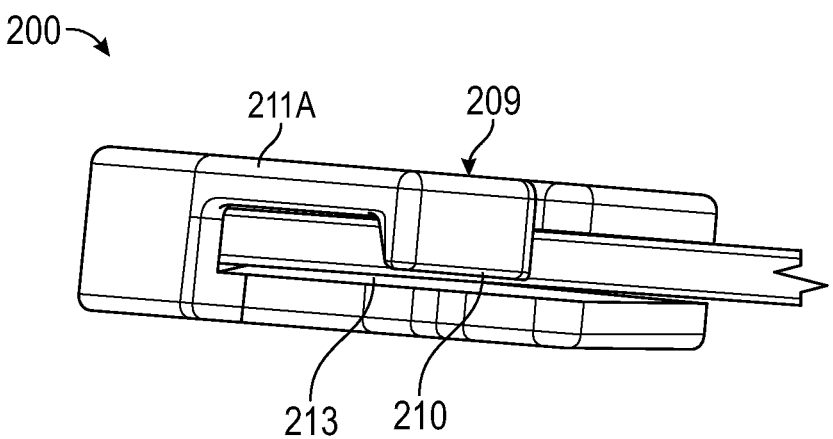
FIG. 46 is a side view thereof.
Figure 56:
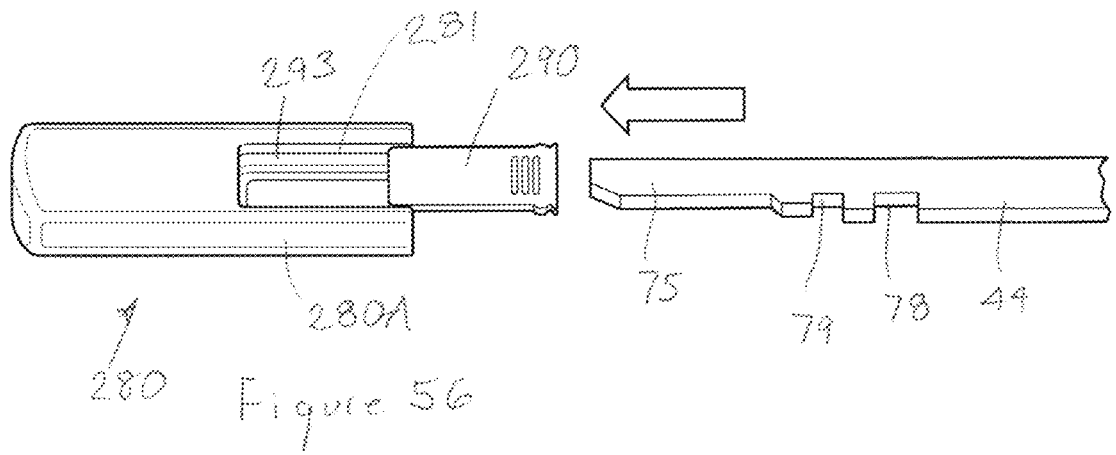
FIG. 56 is a perspective view of an eleventh embodiment of an adapter in combination with a wiper arm.
Figure 57:
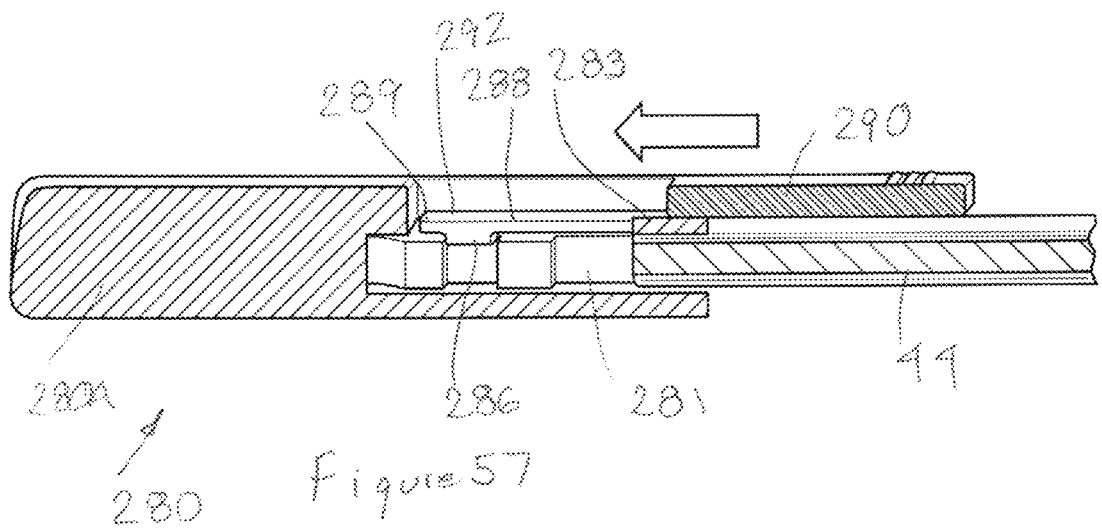
FIG. 57 is a cross-sectional side view thereof with a retention clip being installed.
Figure 58:
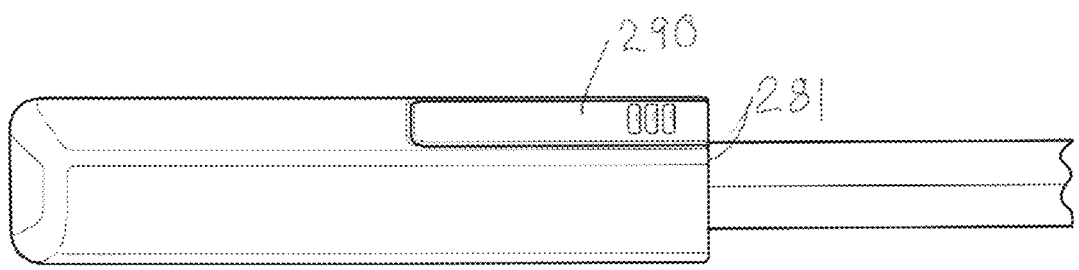
FIG. 58 is a perspective view of the assembled adapter.

The main body 201 further includes a front pocket 205 defined by a portion of the bottom wall 202, an end wall 206 and a top wall 207, wherein the walls 202, 206 and 207 close off the front pocket 205 except for the side that opens into the adapter slot 201. The top wall 207 diverges from the bottom wall 202 to further define a side opening 208 that opens into one side of the adapter slot 201. The side opening 208 is configured to receive the front end 75 of the arm 44 at an entry angle that is angled relative to the final arm orientation as shown by FIGS. 41-43. Once the front end 75 is seated in the front pocket 205, the wiper arm 44 can then be swung downwardly and seated in in the aperture slot 201 as shown in FIG. 42.

To prevent return swinging of the wiper arm 44 out of the adapter slot 201, resiliently deflectable rotation lock 209 is provided, which comprises a stop block 210 that is mounted to the back wall 211. The back wall 211 is resiliently deformable and slotted so that it essentially defines a cantilevered support arm 211A for the stop block 210 that flexes independently due to the slot 211B. The stop block 210 includes a bottom face 212 that abuts against the wiper arm edge 73 to prevent arm rotation as seen in FIG. 43, and includes an inclined or tapered top face 213 that is configured to be contacted by the arm edge 74 during rotation of the wiper arm 44. Since the top face 213 is inclined, contact from the wiper arm 44 flexes the support arm 211A and moves the stop block 210 rearwardly to allow the wiper arm 44 to pass by to the position of FIG. 43. To permit removal of the arm 44, the support arm 211A can be manually flexed rearwardly to permit the arm 44 to rotate from the orientation of FIG. 42 to the orientation of FIG. 41.

For the adapter 200, the mounting of the adapter 200 to a coupler is omitted. It will be understood that the adapter 200 would be provided with suitable pivot connectors for joining to a coupler using any of the various structures disclosed above for this purpose.

Referring to the eighth embodiment of FIGS. 47-49, a twist lock adapter 220 is shown in combination with the wiper arm 44. The adapter 220 comprises a main body 220A, which forms an adapter slot 221. In more detail, the main body comprises a back wall 222 and opposite slot walls 223 and 224, which define the opposite side edges of the adapter slot 221. The one slot wall 223 includes a connector flange 225 that hooks over the arm edge 74. The slot wall 223 also includes lock tabs 226 and 227 for engaging the notch formations 78 and 79 of the wiper arm 44 in accord with the foregoing disclosure.

The opposite slot wall 224 includes a resiliently deflectable retention board 228, which essentially is cantilevered along the bottom edge to permit flexing thereof during arm insertion and thereby define a retention lock. The free edge of the retention board 228 includes a catch or rib 229 and an inclined cam surface 230 to facilitate flexing of the retention board 227.

During assembly, front end 75 of the wiper arm 44 is inserted into the adapter slot 221 with the notch formations 78 and 79 opening downwardly into the adapter slot 221. As such, the formations 78 and 79 are aligned axially with the lock tabs 226 and 227. The adapter 230 and wiper arm 44 are rotated relative to each which flexes the retention board 228 out and engages the notch formations 78 and 79 with the lock tabs 226 and 227 as the wiper arm 44 is rotated and seats fully in the adapter slot 221 as seen in FIG. 49. The rib 229 on the retention board 228 and the slot wall flange 225 thereby fit over the edges 73 and 74 of the wiper arm 44 to hold said arm 44 in position within the adapter slot 221.

For the adapter 220, the mounting of the adapter 220 to a coupler is omitted. It will be understood that the adapter 220 would be provided with suitable pivot connectors for joining to a coupler using any of the various structures disclosed above for this purpose.

Referring to the ninth embodiment of FIGS. 50-52, a side latch adapter 240 is shown in combination with the wiper arm 44. The adapter 240 comprises a main body 240A, which forms an adapter slot 241. The slot wall 243 also includes a retention lock 245 formed with lock tabs 246 and 247 for engaging the notch formations 78 and 79 of the wiper arm 44 in accord with the foregoing disclosure. The retention lock 245 comprises a resiliently deflectable retention board 248, which essentially is cantilevered along the bottom edge to permit flexing thereof during arm insertion. The free end of the retention board 248 includes a pull tab 249 to facilitate flexing of the retention board 248.

The lock tabs 246 and 247 are sized to fit in the respective notch formations 78 and 79 and including ramped faces 250 and 251, which can contact the ramped surfaces 82 and 83 on the wiper arm 44, which thereby cause the retention board 248 to flex outwardly in response to axial sliding of the wiper arm 44 into the adapter slot 241. During assembly, front end 75 of the wiper arm 44 is inserted into the adapter slot 241 with the notch formations 78 and 79 opening in the adapter slot 241 toward the retention board. When the front arm end 75 fully seats in the adapter slot 241, the formations 78 and 79 are aligned axially with the lock tabs 246 and 247, which drop into notch formations 78 and 79.

For the adapter 240, the mounting of the adapter 240 to a coupler is omitted. It will be understood that the adapter 240 would be provided with suitable pivot connectors for joining to a coupler using any of the various structures disclosed above for this purpose.

Referring to the tenth embodiment of FIGS. 53-55, a side latch adapter 260 is shown in combination with the wiper arm 44. The adapter 260 comprises a main body 260A, which forms an adapter slot 261. The slot wall 263 also includes a retention lock 265 formed with lock tabs 266 and 267 for engaging the notch formations 78 and 79 of the wiper arm 44 in accord with the foregoing disclosure. The retention lock 265 comprises a resiliently deflectable retention board 268, which essentially is cantilevered within an interior window 260B to permit flexing thereof during arm insertion. The window 260B is defined on one side by a limiter wall 260C that limits the amount of flexing of the retention board 268. The free end of the retention board 268 includes a pull tab 269 to facilitate flexing of the retention board 268.

The lock tabs 266 and 267 are sized to fit in the respective notch formations 78 and 79 and include ramped faces 270 and 271, which can contact the ramped surfaces 82 and 83 on the wiper arm 44, which thereby cause the retention board 248 to flex outwardly in response to axial sliding of the wiper arm 44 into the adapter slot 261. During assembly, front end 75 of the wiper arm 44 is inserted into the adapter slot 261 with the notch formations 78 and 79 opening in the adapter slot 261 toward the retention board. When the front arm end 75 fully seats in the adapter slot 261, the formations 78 and 79 are aligned axially with the lock tabs 266 and 267, which drop into notch formations 78 and 79.

For the adapter 260, the mounting of the adapter 260 to a coupler is omitted. It will be understood that the adapter 260 would be provided with suitable pivot connectors for joining to a coupler using any of the various structures disclosed above for this purpose.

Referring to an eleventh embodiment of FIGS. 56-64, an adapter 280 is shown in combination with the wiper arm 44. The adapter 280 comprises a main body 280A, which forms an adapter slot 281. An interior slot wall 283 also includes a retention lock 285 formed with lock tabs 286 for engaging the notch formation 79 of the wiper arm 44 in accord with the foregoing disclosure. The retention lock 265 comprises a resiliently deflectable retention board 288, which essentially is cantilevered within the adapter slot 281 to permit flexing thereof during arm insertion. The free end of the retention board 268 includes a pull tab 289 to facilitate flexing of the retention board 288 for arm removal.

The lock tab 286 is sized to fit in the respective notch formation 79 and the retention board 288 may flex outwardly in response to axial sliding of the wiper arm 44 into the adapter slot 281. During assembly, front end 75 of the wiper arm 44 is inserted into the adapter slot 281. When the front arm end 75 fully seats in the adapter slot 281, the formation 79 is aligned axially with the lock tab 286, which drops into notch formation 79.

Figure 59:
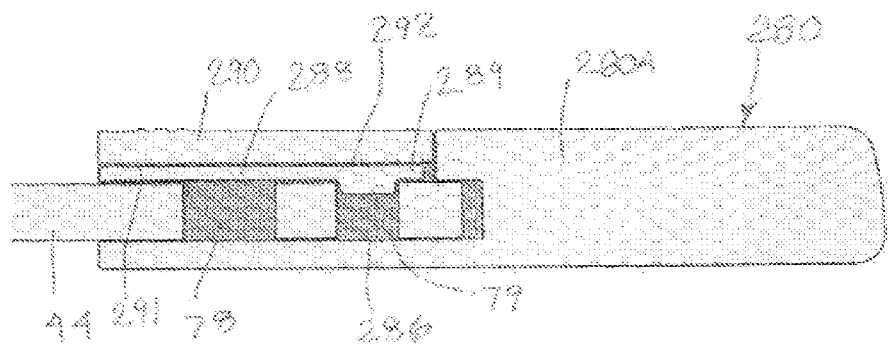
FIG. 59 is a cross-sectional side view with the retention clip in an installed position.
Figure 60:
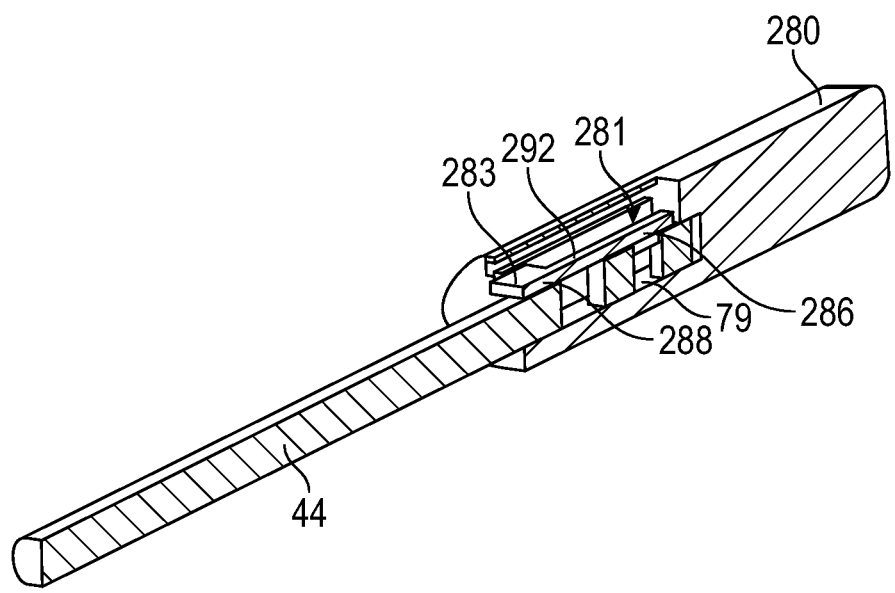
FIG. 60 is a cross-sectional perspective view thereof.

Once the wiper arm 44 is seated in position, a retention clip 290 is slid into the open top of the adapter slot 281. As seen in FIG. 59, the inner face 291 of the retention clip 290 lies closely adjacent the opposing top face 292 of the retention board 288. As such, the retention board 288 cannot disengage from the wiper arm 44.

Figure 61:
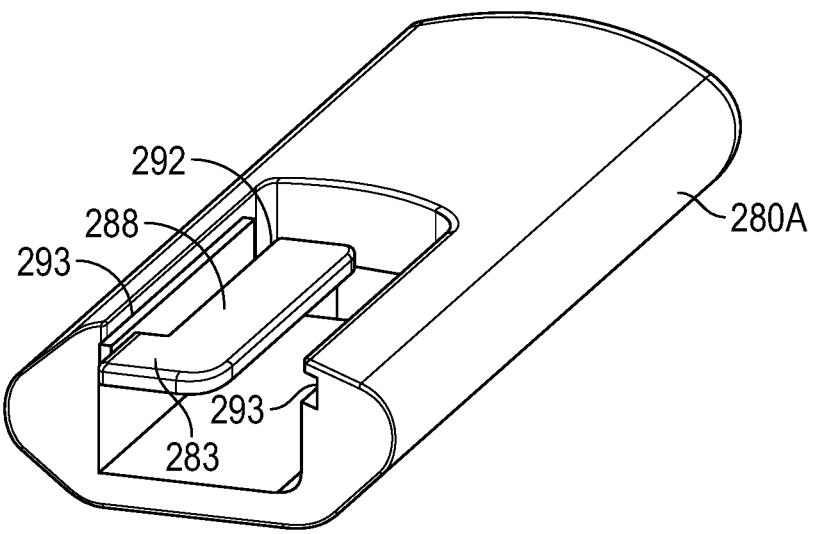
FIG. 61 is a perspective view of the main body.
Figure 62:
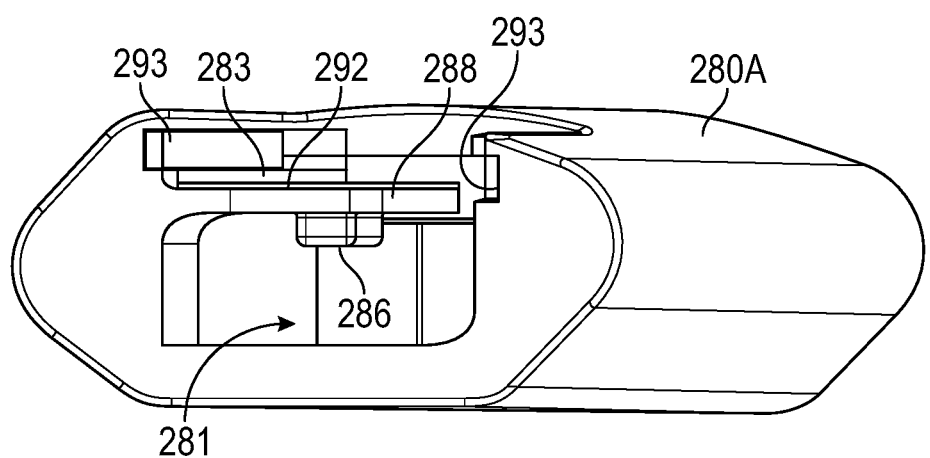
FIG. 62 is an end perspective view thereof.
Figure 63:
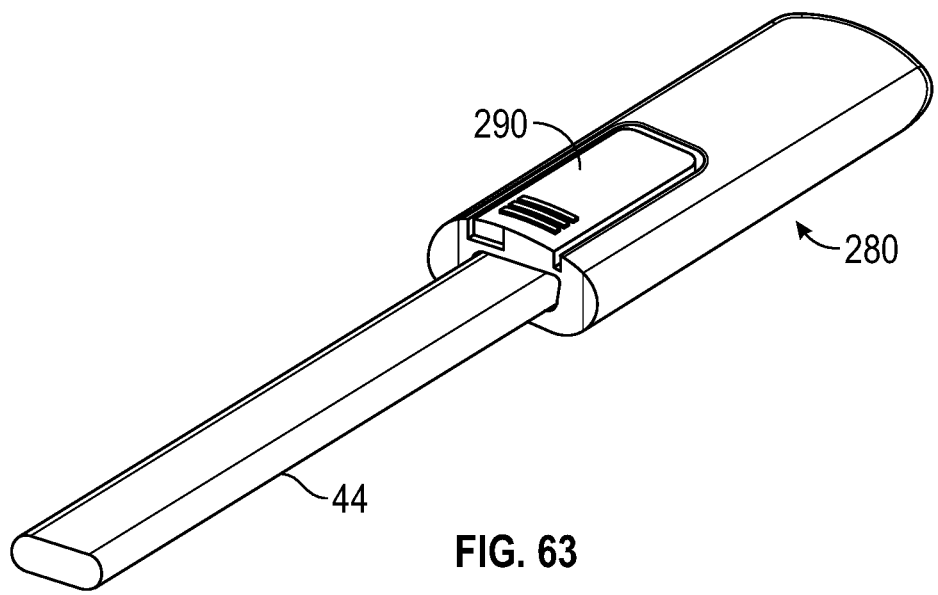
FIG. 63 is a top perspective view thereof.
Figure 64:
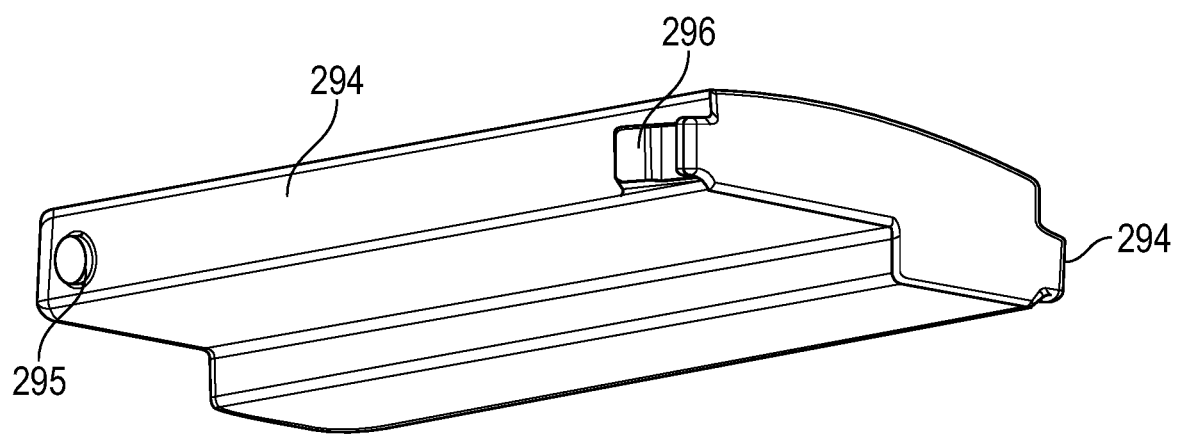
FIG. 64 is a bottom perspective view of the retention clip.

To secure the retention clip 290 in position, a pair of guide tracks or channels 293 are provided above the retention board 288 along the upper side edges of the adapter slot 281 as seen in FIGS. 61 and 62. In turn, the retention clip 290 includes opposite clip edges 294, which slide along the guide tracks 293. More particularly, each clip edge 294 includes projections 295 and 296 on both ends thereof, which slide along the guide tracks 293 and retain the retention clip 290 above the retention board 288.

For the adapter 280, the mounting of the adapter 280 to a coupler is omitted. It will be understood that the adapter 280 would be provided with suitable pivot connectors for joining to a coupler using any of the various structures disclosed above for this purpose.

In addition to the foregoing embodiments, other examples of adaptors are disclosed herein after. FIGS. 65-72 illustrates several spring lock embodiments of the inventive adapter.

Figure 65:
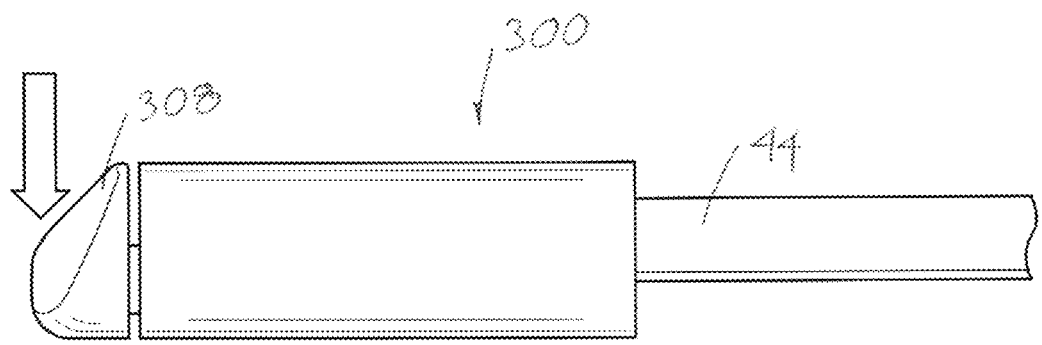
FIG. 65 is a perspective view illustrating a twelfth embodiment of an adapter.

FIG. 65 is a perspective view illustrating a twelfth embodiment of an adapter 300, which is usable with the wiper arm 44. The adapter 300 defines an adapter slot 301 that opens through an end wall 302 and receives the front end 75 of the wiper arm 44 therein. The end wall 302 also includes a cantilevered retention lock 303 that is formed with at least one lock tab 304 and/or 305 that fit into one or more of the notch formations 78 and 79.

The lock tab 304/305 may have an inclined surface 307 that slides along the wiper arm 44 during insertion into the adapter slot 301. When aligned, the lock tabs 304 and/or 305 seat within the respective notch formations 78 and 79 in the wiper arm 44, and when engaged, the wiper arm 44 is prevented from being pulled out of the adapter slot 301.

The retention lock 303 also includes an exposed button 308 that can be pressed to disengage the wiper arm 44. The retention lock 303 also has a lock body 309 that connects to the end wall 302 in cantilevered relation so as to be resiliently deflectable.

Figure 67:
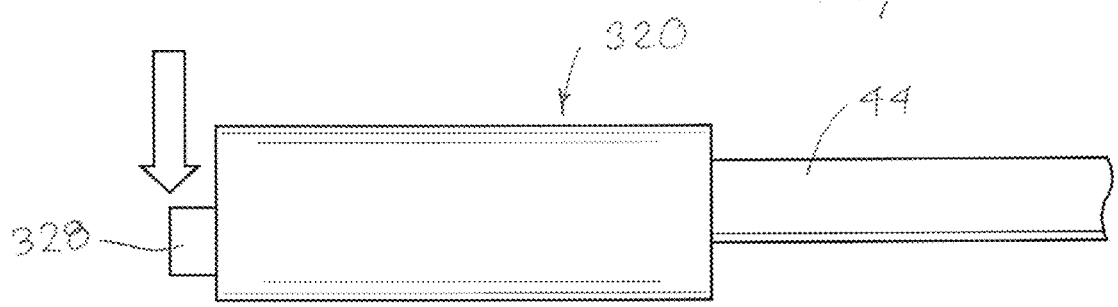
FIG. 67 is a perspective view illustrating a thirteenth embodiment of an adapter.

FIG. 67 is a perspective view illustrating a thirteenth embodiment of an adapter 320, which is usable with the wiper arm 44. The adapter 320 defines an adapter slot 321 that opens through an end wall 322 and receives the front end 75 of the wiper arm 44 therein. The end wall 322 also includes a cantilevered retention lock 323 that is formed with at least one lock tab 324 and/or 325 that fit into one or more of the notch formations 78 and 79.

The lock tab 324/325 may have an inclined surface 327 that slides along the wiper arm 44 during insertion into the adapter slot 321. When aligned, the lock tabs 324 and/or 325 seat within the respective notch formations 78 and 79 in the wiper arm 44, and when engaged, the wiper arm 44 is prevented from being pulled out of the adapter slot 321.

The retention lock 323 also includes an exposed button 328 that can be pressed to disengage the wiper arm 44. The retention lock 323 also has a lock body 329 that connects to the end wall 322 in cantilevered relation so as to be resiliently deflectable.

Figure 70:
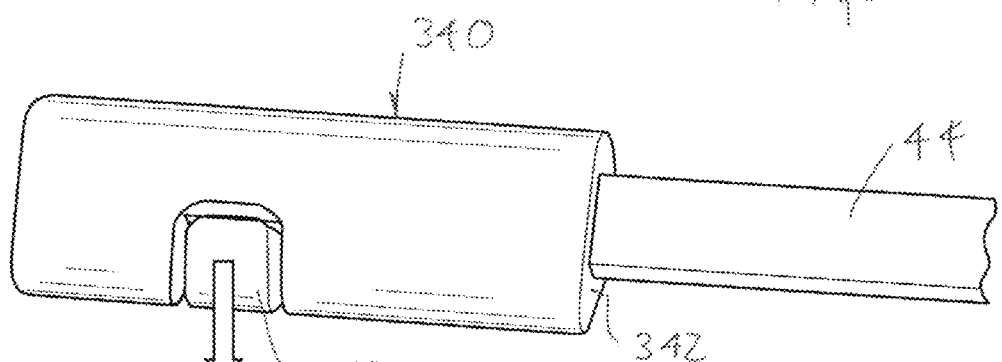
FIG. 70 is a perspective view illustrating a fourteenth embodiment of an adapter.
Figure 71:
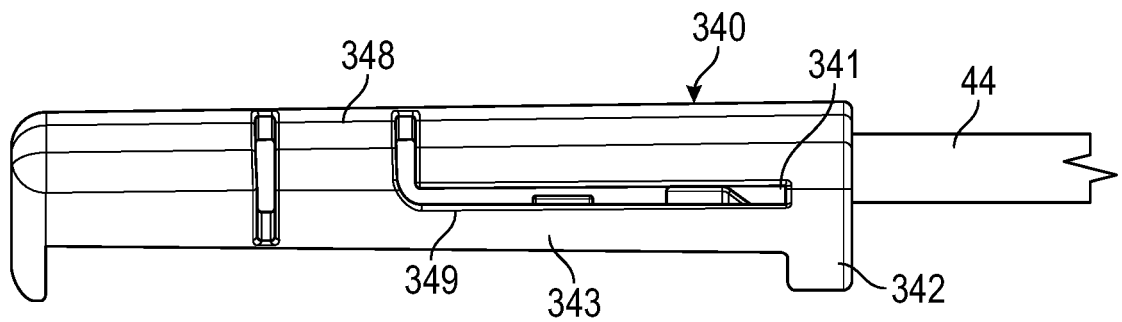
FIG. 71 is a bottom view thereof.

Referring to FIGS. 70 and 71, the adapter 340 is a fourteenth embodiment, which is usable with the wiper arm 44. The adapter 340 defines an adapter slot 341 that opens through an end wall 342 and receives the front end 75 of the wiper arm 44 therein. The end wall 342 also includes a cantilevered retention lock 343 that is formed with at least one lock tab that each fit into one or more of the notch formations. The lock tab may have an inclined surface that slides along the wiper arm 44 during insertion into the adapter slot 341.

The retention lock 343 also includes an exposed button 348 that may be located midways along the length of the adapter 340 and that can be pressed to disengage the wiper arm 44. The retention lock 343 also has a lock body 349 that connects to the end wall 322 in cantilevered relation so as to be resiliently deflectable.

Figure 72:
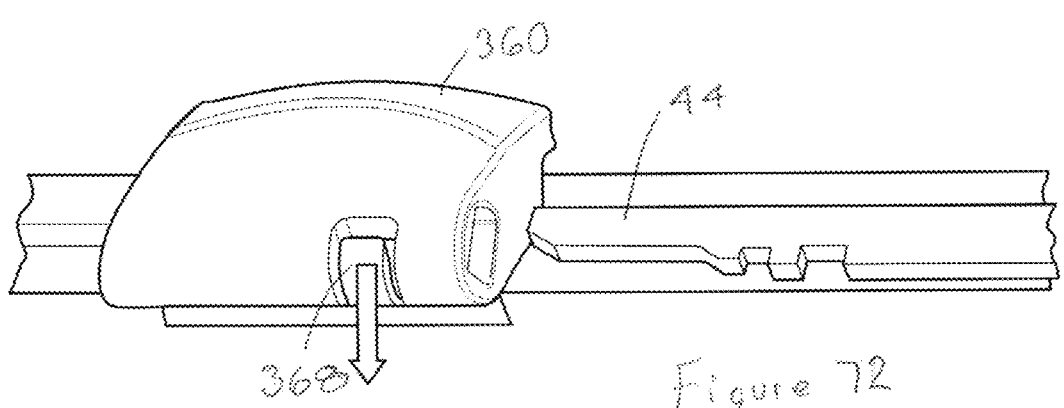
FIG. 72 is a modified variation of the embodiment of FIG. 70.
Figure 66:
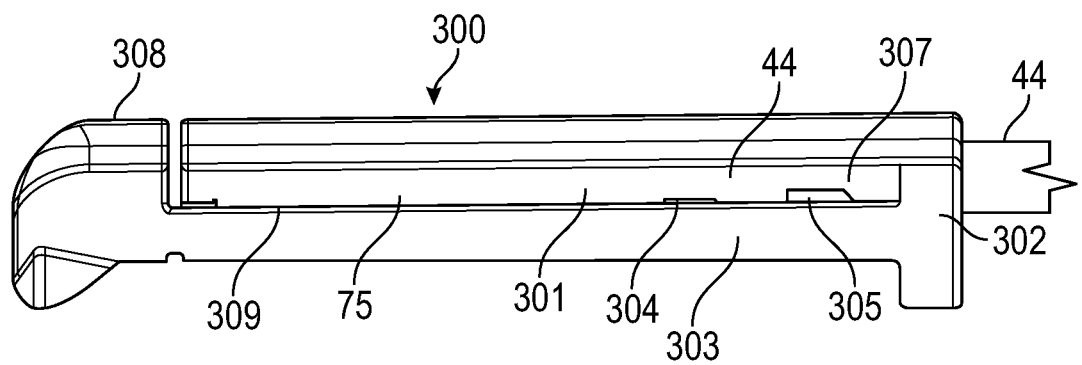
FIG. 66 is a bottom view thereof.
Figure 68:
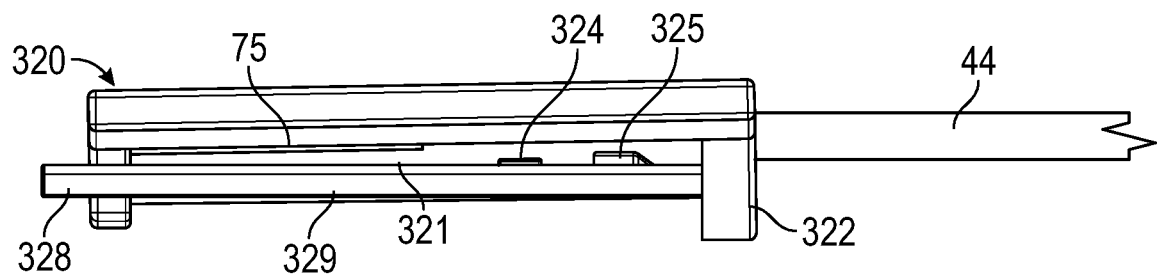
FIG. 68 is a bottom view thereof.
Figure 69:
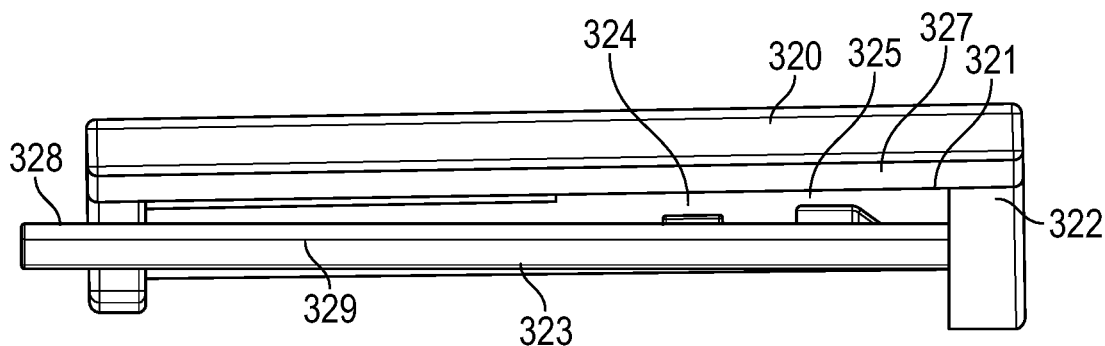
FIG. 69 is a bottom view thereof with the wiper arm removed.

FIG. 72 illustrates an alternate design for an adapter 360 wherein the lock body may be relatively short such as seen in FIG. 33 and wherein the retention lock has the lock body extending a shorter distance along the edge of the adapter 360 with the button 368 exposed for manual actuation and release of the wiper blade 44.

Here again, the adapter 160 incorporates resiliently deflectable components that allow insertion of the wiper arm 44 into releasable engagement with the adapter 160.

Figure 73:
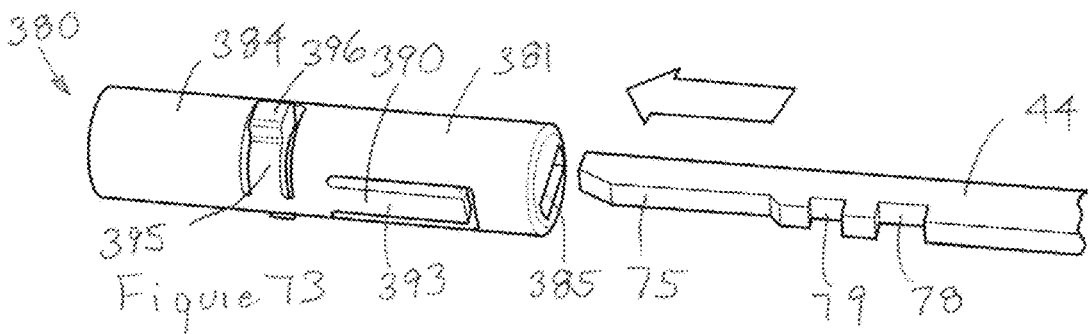
FIG. 73 is an exploded perspective view of a retention clip and wiper arm of a fifteenth embodiment of the present invention.
Figure 74:
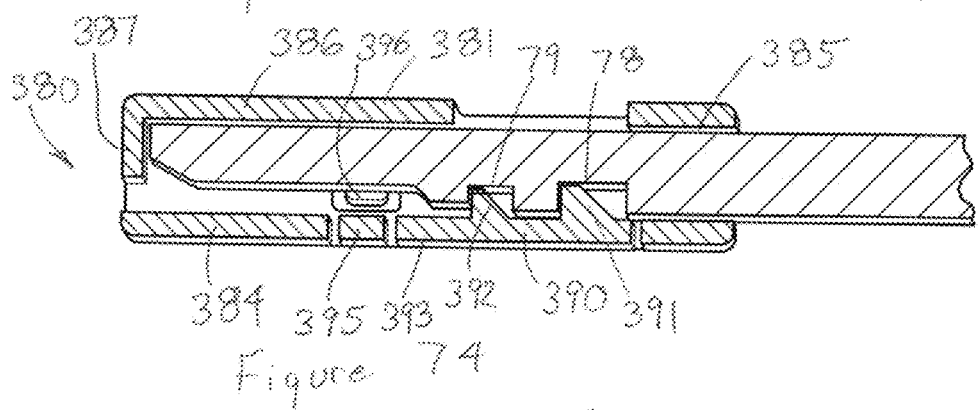
FIG. 74 is a cross sectional side view thereof.
Figure 75:
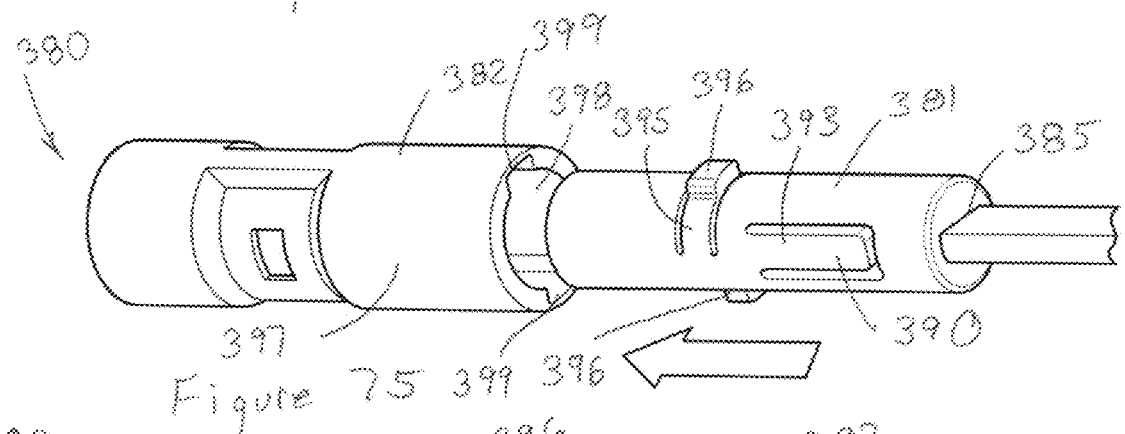
FIG. 75 is an exploded view of the retention clip being assembled with an adapter body.
Figure 76:
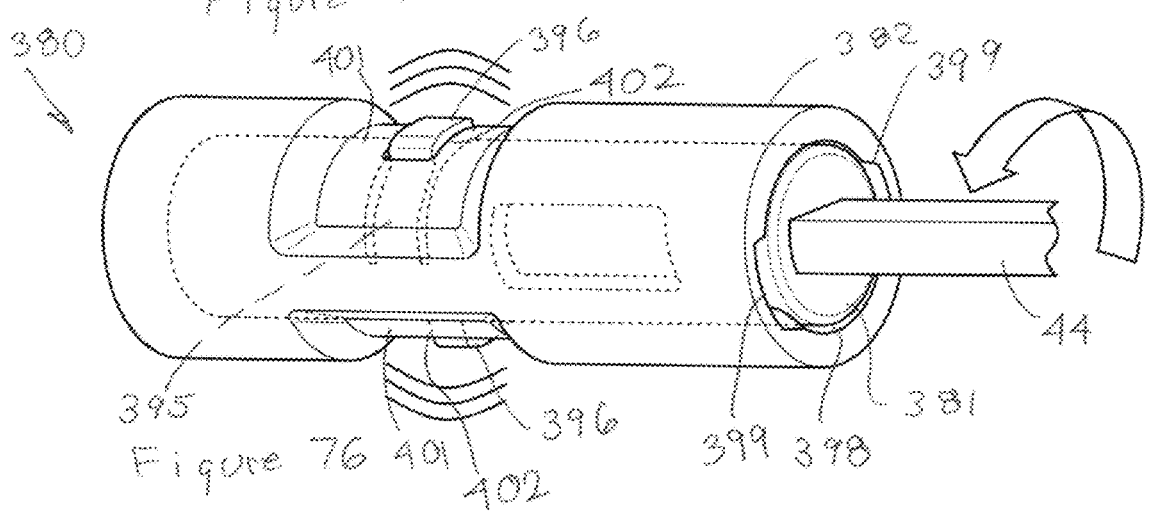
FIG. 76 is a side perspective view showing the retention clip, adapter body and wiper arm assembled together.
Figure 77:
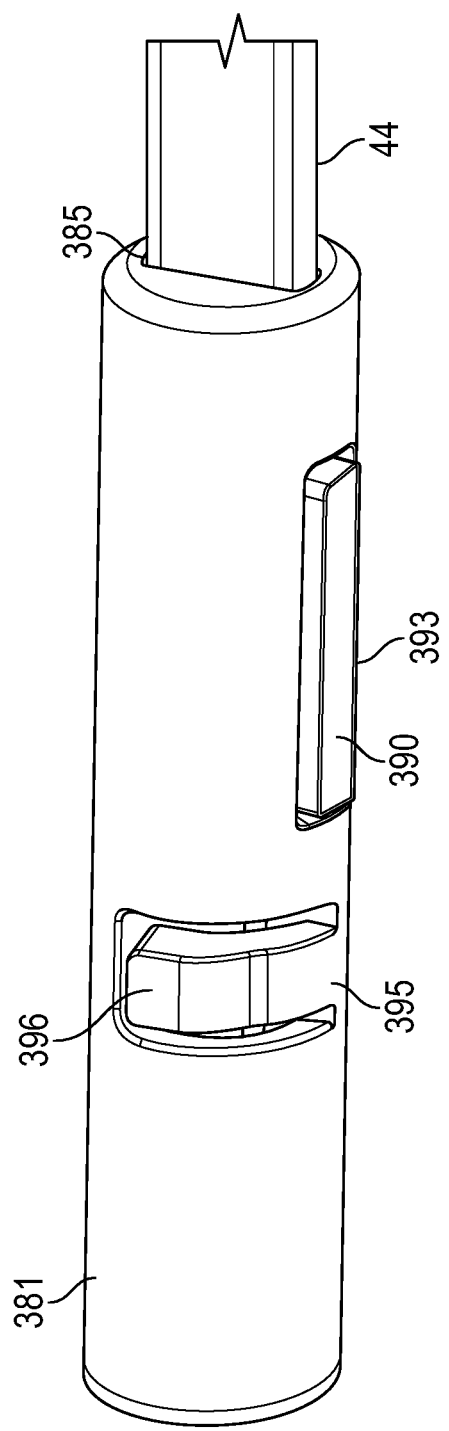
FIG. 77 is an enlarged perspective view of the retention clip and wiper arm when assembled.

Next, FIG. 73 is an exploded perspective view of an adapter 380 having a retention clip 381 and wiper arm 44 of a fifteenth embodiment of the present invention. FIG. 75 is an exploded view of the retention clip 381 being assembled with an adapter body 382. FIG. 76 is a side perspective view showing the retention clip 381, adapter body 382 and wiper arm 44 assembled together.

In more detail, the retention clip 381 and adapter body 382 are separate components but can be assembled together. First, the retention clip 381 is mounted on the free end 75 of the wiper arm 44, and then this sub-assembly is inserted into engagement with the adapter body 382.

The retention clip 381 comprises a tubular clip housing 384 defining an adapter slot 385 for receiving the wiper arm 44. The clip housing 384 includes a side wall 386 surrounding the adapter slot 385 and an end wall 387 that at least partially closes the slot 385. The end wall 387 stops insertion of the wiper arm 44.

The side wall 386 also includes a retention lock 390 formed with lock tabs 391 and 392 for engaging the notch formations 78 and 79 of the wiper arm 44 in accord with the foregoing disclosure. The retention lock 390 comprises a resiliently deflectable retention board 393, which is defined on three sides by a slot and essentially is cantilevered on one side of the adapter slot 281 to permit flexing thereof during arm insertion. The free end of the retention board 393 automatically engages with the wiper arm 44 upon insertion, which seats the lock tabs 391 and 392 within the notch formations 78 and 79. Generally, the retention board 393 is released from the wiper blade 44 by using a tool to pry up and deflect the retention board 393. As such, the clip housing 384 is pre-assembled to the wiper arm 44.

The clip housing 384 also includes at least one and preferably a pair of diametrically opposed locking arms 395 having radial projections 396. The projections 396 are configured to releasably lock with the adapter body 382. The adapter body 382 includes an annular body wall 397 defining a central bore 398, which is configured to receive the retainer clip 381 therein. The opposite sides of the bore 398 include elongate, slot-like keyways or keyed slots 399, which are configured to receive the projections 396 projecting out of the retainer clip 381.

The keyed slots 399 allow the retainer clip 381 to be slid into the bore 398 of the adapter body 382. The adapter body 382 also include thin-walled central wall sections 401 on opposite sides of the adapter body 382. These central wall sections 401 include locking windows 402 that receive the radial projections 396 to thereby lock the retainer clip 381 and wiper arm 14 together as seen in FIG. 76. The windows 402 are offset 90 degrees from the keyed slots 399 such that assembly is accomplished by sliding the retainer clip 381 into the bore 398 with the projections 396 sliding along the keyed slots 399. When fully inserted and the sub-assembly bottoms out in the bore 398, the retainer clip 381 can be rotated 90 degrees so that the locking arms 395 flex and allow the radial projections 396 to retract during clip rotation and then extend into the respective windows 402 when aligned. In this manner, the retainer clip 381 is locked to the adapter body 382. For removal, the projections 396 may be manually pinched and moved radially inwardly into the bore 398 and then the retainer clip 381 and wiper arm 44 are rotated to realign the projections 396 with the keyed slots 399.

Here again, the adapter 380 is engagable with a suitable coupler, wherein the coupler has been omitted for clarity of illustration.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. An adapter for joining a wiper arm with a wiper blade of a vehicle wiper assembly, said adapter comprising:
   an adapter body having an axially-elongate adapter slot configured to receive an end of a wiper arm in releasable engagement, said adapter slot opening sidewardly for receipt of said end of said wiper arm inserted therein, said wiper arm including one or more notch formations in a side edge thereof;
   a retention lock extending from said adapter body and joined at one end to the adapter body, the retention lock comprising a resiliently deformable portion of said adapter body and including one or more lock tabs, wherein the one or more lock tabs are configured to seat in said notch formations to prevent axial displacement of said wiper arm within said adapter slot, said retention lock and said lock tabs being adapted to move outwardly in response to insertion of said wiper arm into said adapter slot and adapted to move inwardly to permit engagement of the lock tabs with the one or more notch formation when aligned with each other.

2. The adapter for joining a wiper arm according to claim 1, wherein said retention lock is resiliently deformable and carries said lock tabs for reversible movement of said lock tabs into and out of engagement with said notch formations.

3. The adapter for joining a wiper arm according to claim 2, wherein said adapter body is formed of a resilient deformable material, which flexes during deformation of said retention lock.

4. The adapter for joining a wiper arm according to claim 3, wherein said retention lock is supported on said adapter body in cantilevered relation.

5. The adapter for joining a wiper arm according to claim 1, wherein said retention lock is formed integral with said adapter body.

6. The adapter for joining a wiper arm according to claim 5, wherein said retention lock is formed as a support arm which has one end joined to said adapter body in cantilevered relation and an opposite free end supporting said one or more lock tabs.

7. The adapter for joining a wiper arm according to claim 1, wherein said adapter pivotally mounts to a coupler which supports said wiper assembly.

8. The adapter for joining a wiper arm according to claim 1, wherein said adapter body deforms during movement of the wiper arm to an installed position engaged with said one or more lock tabs.

9. The adapter for joining a wiper arm according to claim 8, wherein said wiper arm is displaceable axially into said adapter slot in a first orientation and is rotatable to a second orientation to lock said wiper arm in said adapter slot.

10. The adapter for joining a wiper arm according to claim 9, wherein said adapter body includes deformable sections which deform during rotation of said wiper arm.

11. The adapter for joining a wiper arm according to claim 1, wherein said retention lock is manually actuatable by a user to displace said lock tabs out of said notch formations.

12. The adapter for joining a wiper arm according to claim 1, wherein said retention lock is provided on a retention clip which is mountable to said wiper arm, and said retention clip in turn is insertable into said adapter body for releasable securement by locking members acting between said retention clip and said adapter body.

13. An adapter for joining a wiper arm with a wiper blade of a vehicle wiper assembly, said adapter comprising:
   an adapter body having an axially-elongate adapter slot configured to receive an end of a wiper arm in releasable engagement, said adapter slot opening sidewardly for receipt of said end of said wiper arm inserted therein, said wiper arm including one or more notch formations in a side edge thereof;
   a retention lock extending from said adapter body and joined at one end to the adapter body, the retention lock comprising comprising a resiliently deformable portion of said adapter body and including one or more lock tabs, wherein the one or more lock tabs are configured to seat in said notch formations to prevent axial displacement of said wiper arm within said adapter slot, said retention lock and adapted to permit movement of said lock tabs relative to said notch formations in response to insertion of said wiper arm into said adapter slot and adapted to move inwardly to permit engagement of the lock tabs with the one or more notch formations when aligned with each other.

14. The adapter for joining a wiper arm according to claim 13, wherein said adapter body deforms during movement of said retention lock and said one or more lock tabs.

15. The adapter for joining a wiper arm according to claim 14, wherein said wiper arm is displaceable axially into said adapter slot in a first orientation and is rotatable to a second orientation to lock said wiper arm in said adapter slot.

16. The adapter for joining a wiper arm according to claim 13, wherein said adapter body includes deformable sections which deform during rotation of said wiper arm.

17. The adapter for joining a wiper arm according to claim 13, wherein said retention lock is manually actuatable by a user to displace said lock tabs out of said notch formations.

18. The adapter for joining a wiper arm according to claim 13 and provided in combination with said wiper arm.

19. The adapter for joining a wiper arm according to claim 18, wherein said wiper arm has opposite side edges and has said notch formations formed in only one of said side edges.

20. The adapter for joining a wiper arm according to claim 18, wherein said notch formations comprise first and second notch sections, which are axially spaced and have different depths and axial lengths.

* * * * *